(12) United States Patent
McCallister

(10) Patent No.: US 10,090,900 B2
(45) Date of Patent: *Oct. 2, 2018

(54) EXCURSION COMPENSATION IN MULTIPATH COMMUNICATION SYSTEMS HAVING PERFORMANCE REQUIREMENTS PARAMETERS

(71) Applicant: CCIP, LLC, Scottsdale, AZ (US)

(72) Inventor: Ronald Duane McCallister, Scottsdale, AZ (US)

(73) Assignee: CCIP, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,691

(22) Filed: Feb. 20, 2018

(65) Prior Publication Data
US 2018/0175919 A1 Jun. 21, 2018

Related U.S. Application Data

(63) Continuation of application No. 15/406,441, filed on Jan. 13, 2017, now Pat. No. 9,941,946, which is a (Continued)

(51) Int. Cl.
*H04B 7/0456* (2017.01)
*H04B 17/336* (2015.01)
(Continued)

(52) U.S. Cl.
CPC ............. *H04B 7/0456* (2013.01); *H04B 7/04* (2013.01); *H04B 17/336* (2015.01);
(Continued)

(58) Field of Classification Search
CPC ............... H04L 27/2636; H04L 1/0057; H04L 27/2628; H04B 7/0456
(Continued)

(56) References Cited

U.S. PATENT DOCUMENTS 7,218,254 B2  5/2007 Kahlman
7,251,463 B2  7/2007 McCallister
(Continued)

OTHER PUBLICATIONS

Abdul Wakeel, "Peak-to-Average Ratio Reduction for MIMO and Multi-user OFDM Systems", Jacobs University, School of Engineering and Science, Dissertation for Doctor of Philosophy in Electrical Engineering, Jacobs University Bremen, pp. 1-135, Dec. 2015.

(Continued)

*Primary Examiner* — Emmanuel Bayard
(74) *Attorney, Agent, or Firm* — Schmeiser, Olsen & Watts LLP

(57) ABSTRACT

Methods, apparatuses, and systems that compensate for communication excursions in multipath communication systems (e.g. MIMO communication systems) while satisfying performance requirements parameters of the communication system. A plurality of communication signals may be received in a transmitter. The plurality of communication signals may be precoded (e.g. mixed) into a plurality of precoded communication signals. Excursions in the precoded communication signals may be scaled to generate a plurality of excursion compensated precoded communication signals. The scaling may be based on performance requirements parameters of a communication system and based on parameters of the precoding the plurality of communication signals. The plurality of excursion compensated precoded communication signals may then be amplified by a plurality of amplifiers.

34 Claims, 9 Drawing Sheets

Figure 1:
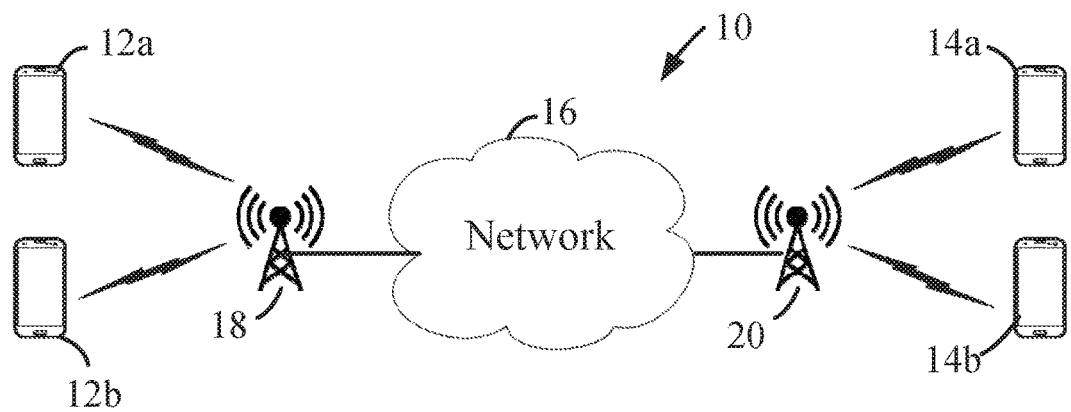

Related U.S. Application Data continuation of application No. 15/356,296, filed on Nov. 18, 2016, now Pat. No. 9,848,342.

(60) Provisional application No. 62/364,714, filed on Jul. 20, 2016.

(51) Int. Cl.
   *H04B 7/04* (2017.01)
   *H04W 24/02* (2009.01)
   *H04W 52/52* (2009.01)
   *H04B 7/0413* (2017.01)
   *H04W 84/12* (2009.01)

(52) U.S. Cl.
   CPC ........... *H04W 24/02* (2013.01); *H04W 52/52* (2013.01); *H05K 999/99* (2013.01); *H04B 7/0413* (2013.01); *H04W 84/12* (2013.01)

(58) Field of Classification Search
   USPC .................................. 375/260, 299, 267
   See application file for complete search history.

(56) References Cited

U.S. PATENT DOCUMENTS

| | | |
|---|---|---|
| 7,295,816 B2 | 11/2007 | McCallister |
| 7,747,224 B2 | 6/2010 | McCallister et al. |
| 7,751,786 B2 | 7/2010 | McCallister et al. |
| 7,778,347 B2 | 8/2010 | Chen |
| 7,783,260 B2 | 8/2010 | McCallister et al. |
| 7,860,194 B2 | 12/2010 | Kim |
| 7,869,767 B2 | 1/2011 | McCallister et al. |
| 8,098,744 B2 | 1/2012 | Chen |
| 8,130,862 B2 | 3/2012 | Forenza |
| 8,185,065 B2 | 5/2012 | McCallister |
| 8,401,095 B2 | 3/2013 | Han |
| 8,582,687 B2 | 11/2013 | Terry |
| 8,787,493 B2 | 7/2014 | Ohlmer |
| 8,804,873 B1 | 8/2014 | McCallister |
| 8,824,574 B2 | 9/2014 | McCallister et al. |
| 8,848,819 B2 | 9/2014 | Murakami |
| 8,909,175 B1 | 12/2014 | McCallister |
| 8,913,626 B2 | 12/2014 | Malkin |
| 8,934,854 B2 | 1/2015 | McCallister |
| 8,948,713 B2 | 2/2015 | Kratochwil et al. |
| 8,958,500 B2 | 2/2015 | Huang |
| 8,995,568 B1 | 3/2015 | Wu |
| 2003/0202460 A1 | 10/2003 | Jung |
| 2004/0028148 A1 | 2/2004 | Dowling |
| 2005/0163252 A1 | 7/2005 | McCallister |
| 2007/0082617 A1 | 4/2007 | McCallister |
| 2008/0013476 A1* | 1/2008 | Vasudevan ............ H04B 1/707 370/328 |
| 2008/0232503 A1 | 9/2008 | Kim |
| 2008/0273618 A1* | 11/2008 | Forenza ................ H04B 7/022 375/261 |
| 2008/0285640 A1 | 11/2008 | McCallister |
| 2009/0052577 A1 | 2/2009 | Wang |
| 2009/0285271 A1 | 11/2009 | Perez De Aranda Alonso |
| 2010/0048146 A1 | 2/2010 | McCallister |
| 2011/0064162 A1 | 3/2011 | McCallister |
| 2011/0092173 A1 | 4/2011 | McCallister |
| 2012/0307937 A1 | 12/2012 | Higuchi |
| 2013/0141160 A1 | 6/2013 | Ohkawara |
| 2013/0208609 A1 | 8/2013 | Sripathi |
| 2013/0215935 A1 | 8/2013 | Nuzman |
| 2013/0329830 A1 | 12/2013 | Yokomakura |
| 2014/0064342 A1 | 3/2014 | Jongren |
| 2014/0065986 A1 | 3/2014 | McCallister |
| 2014/0139286 A1 | 5/2014 | Laporte |
| 2014/0192925 A1 | 7/2014 | Li |
| 2014/0269987 A1 | 9/2014 | Gubeskys |
| 2014/0307768 A1 | 10/2014 | Gotman |
| 2014/0362934 A1 | 12/2014 | Kumar |
| 2015/0200797 A1 | 7/2015 | McCallister |
| 2015/0256373 A1 | 9/2015 | Huang |
| 2017/0033809 A1 | 2/2017 | Liu |
| 2018/0026685 A1* | 1/2018 | McCallister ......... H04B 7/0456 |
| 2018/0027427 A1* | 1/2018 | McCallister ......... H04B 17/336 |

OTHER PUBLICATIONS

Hyung G. Myung et al., "Peak Power Characteristics of Single Carrier FDMA MIMO Precoding System", Dept. of Electrical and Computer Engineering Polytechnic University, IEEE, 2007, pp. 1-5, Brooklyn, NY.

Raviv Raich et al., "Orthogonal Polynomials for Power Amplifier Modeling and Predistorter Design", IEEE Transactions on Vehicular Technology, vol. 53, No. 5, Sep. 2004, pp. 1468-1480, School of Electrical and Computer Engineering, Georgia Institute of Technology, Atlanta, GA.

Hyung G. Myung, "Introduction to Single Carrier FDMA", 15th European Signal Processing Conference (EUSIPCO 2007), Sep. 3-7, 2007, copyright by EURASIP; Poznan, Poland.

Hyung G. Myung, "Peak-to-Average Power Ration of Single Carrier FDMA Signals with Pulse Shaping", 17th Annual IEEE Int. Symposium on Personal, Indoor and Mobile Radio Communications (PIMRC'06), USA, 2006.

Chung Him (George) Yuen et al., "Single Carrier Frequency Division Multiple Access (SC-FDMA) for Filter Bank Multicarrier Communication System" ECE Dept University of Utah, 2010.

* cited by examiner

EXCURSION COMPENSATION IN MULTIPATH COMMUNICATION SYSTEMS HAVING PERFORMANCE REQUIREMENTS PARAMETERS

This U.S. Patent Application claims priority to U.S. Provisional Patent Application No. 62/364,714, which was filed on Jul. 20, 2016, U.S. patent application Ser. No. 15/356,296, which was filed on Nov. 18, 2016, and U.S. patent application Ser. No. 15/406,441, which was filed on Jan. 17, 2017 which are all hereby incorporated by reference herein in their entireties.

BACKGROUND

Communication systems such as mobile telephone systems, internet connected computing devices, long distance communication lines, satellite systems, and other systems have had a profound effect on human development. Communication systems have made the world a smaller place by allowing people to communicate over great distances with relative ease. Mobile telephone systems have allowed people to be accessible and have access to data resources around the clock. These systems are relatively complicated and have many complementary components. As communication systems develop, there are increasing demands that the systems are designed to operate more efficiently and perform with increasing effectiveness. For example, mobile phones are expected to be able to transmit more data and have a minimized battery size.

In wireless communication systems, electrical data signals (e.g. voice signals, internet data, etc.) are transmitted from a transmitter to a receiver using antennas. In order for these electrical data signals to be propagated as radio waves with adequate strength, prior to the electrical data signals being propagated by an antenna, the electrical data signals need to be amplified by an amplifier. Amplifiers, particularly for high performing wireless devices, are relatively expensive and sensitive components. Accordingly, when a communication system is designed, cost and operation of an amplifier is carefully considered. For instance, if the amplifiers are too expensive, then a communication system cannot be constructed that is commercially viable. Likewise, if the amplifiers that are affordable for a communication system have inadequacies, then a communication system may not be functionally viable. As another example, if amplifiers implemented in battery operated devices (e.g. mobile telephones) are operated in an inefficient manner, then there may be undesirable battery drain, which could as a result undesirably increase the size and/or weight of the battery operated devices.

In communications systems, a relatively low power communication signal conveying data may be input into an amplifier and the amplifier may output a higher power communication signal. Although the relatively low power communication signal is inadequate to create radio waves through an antenna, the higher power communication signal may be propagated through an antenna so that communication is possible between two wireless devices. However, if the relatively low power communication signal input into the amplifier is too high, the amplifier will not operate properly, causing problems such as distortions or interference. If the relatively low power communication signals are too low, link data capacity is reduced or amplifier power efficiency may be non-optimal. Accordingly, in order to maximize the utility of an amplifier, the low power communication signal input into the amplifier should be as strong as possible relative to the signal magnitude threshold of an amplifier without the relatively low power communication signals exceeding the signal magnitude threshold of the amplifier. The signal magnitude threshold of an amplifier is related to the maximum signal strength that an amplifier can receive without causing distortions or interference.

Portions of the relatively low input communication signal input into an amplifier whose magnitude exceeds the signal magnitude threshold may be referred to as excursions. These excursions can be suppressed, thus allowing an amplifier to operate without distortions or interference or in an optimal power efficient manner. However, when these excursions are suppressed without frequency domain considerations, random noise at unacceptable levels may be introduced into the communication signal, which can unacceptably increase the rate of bit errors over the communication link. Many communication systems (e.g. LTE mobile phone communication systems) have performance requirements parameters, which constrain noise levels below certain levels relative to associated signal power. Accordingly, when excursions are suppressed, then these performance requirements parameters must also be satisfied.

Some communications systems are multipath communication systems where a transmitter has multiple antennas and a receiver has multiple antennas, which transmit and receive the same frequencies. Normally, competing signals transmitted and received using the same frequencies suffer from destructive interference. However, in multiple-in multiple-out (MIMO) communication systems or other multipath communication signals, the parallel signals can be strategically mixed together to manipulate the multipath radio environment. These mixed signals also have the challenge that they should not have excursions which exceed the signal magnitude thresholds of the associated amplifiers. Since these MIMO communication signals are a strategic mix of communication signals which may have different performance requirements parameters, it is a substantial challenge to compensate for these excursions while at the same time satisfying the performance requirements parameters of the communication system.

SUMMARY

Embodiments relate to methods, apparatuses, and systems that compensate for communication excursions in multipath communication systems (e.g. MIMO communication systems) while satisfying performance requirements parameters of the communication system. A plurality of communication signals may be received in a transmitter. The plurality of communication signals may be precoded (e.g. mixed) into a plurality of precoded communication signals. Excursions in the precoded communication signals may be scaled to generate a plurality of excursion compensated precoded communication signals. The scaling may be based on performance requirements parameters of a communication system and based on parameters of the precoding the plurality of communication signals. The plurality of excursion compensated precoded communication signals may then be amplified by a plurality of amplifiers.

DRAWINGS

Example FIG. 1 illustrates a communications network, in accordance with embodiments.

Figure 2:
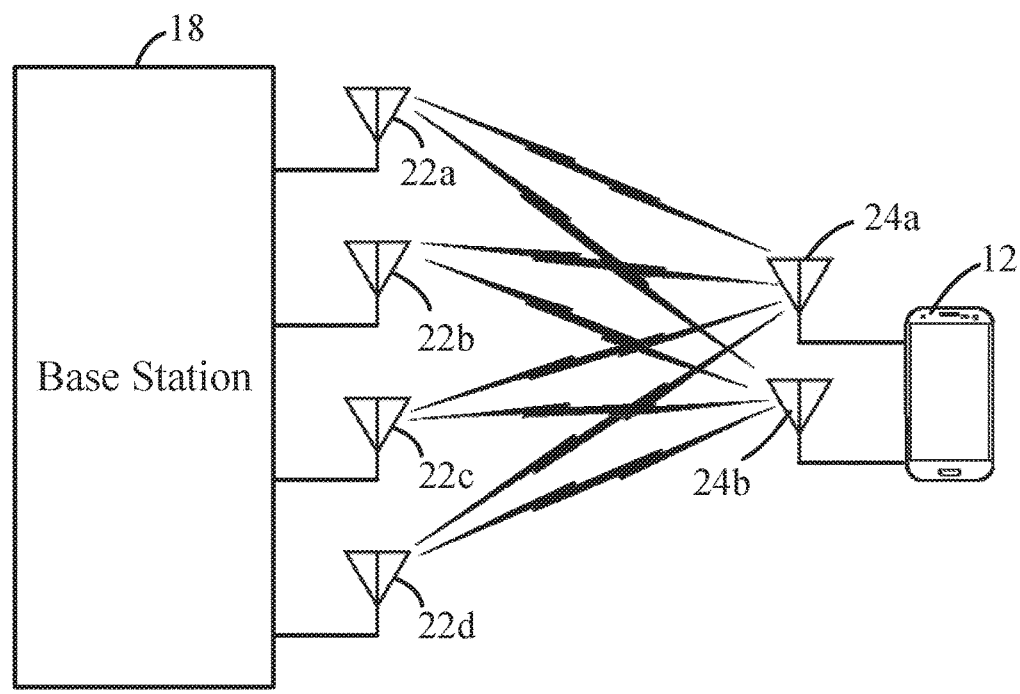

Example FIG. 2 illustrates a base station in wireless communication with a mobile phone, in accordance with embodiments.

Figure 3:
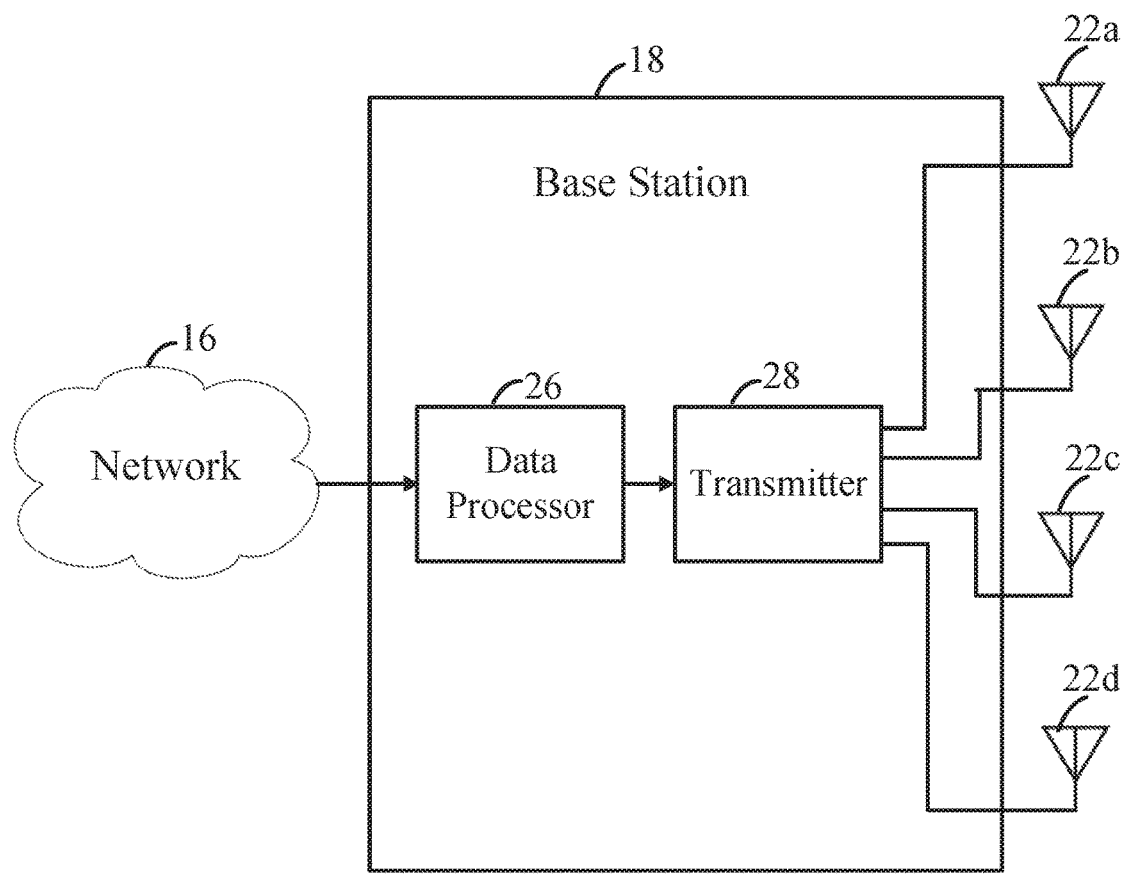

Example FIG. 3 illustrates simplified aspects of a multi-antenna base station, in accordance with embodiments.

Figure 4:
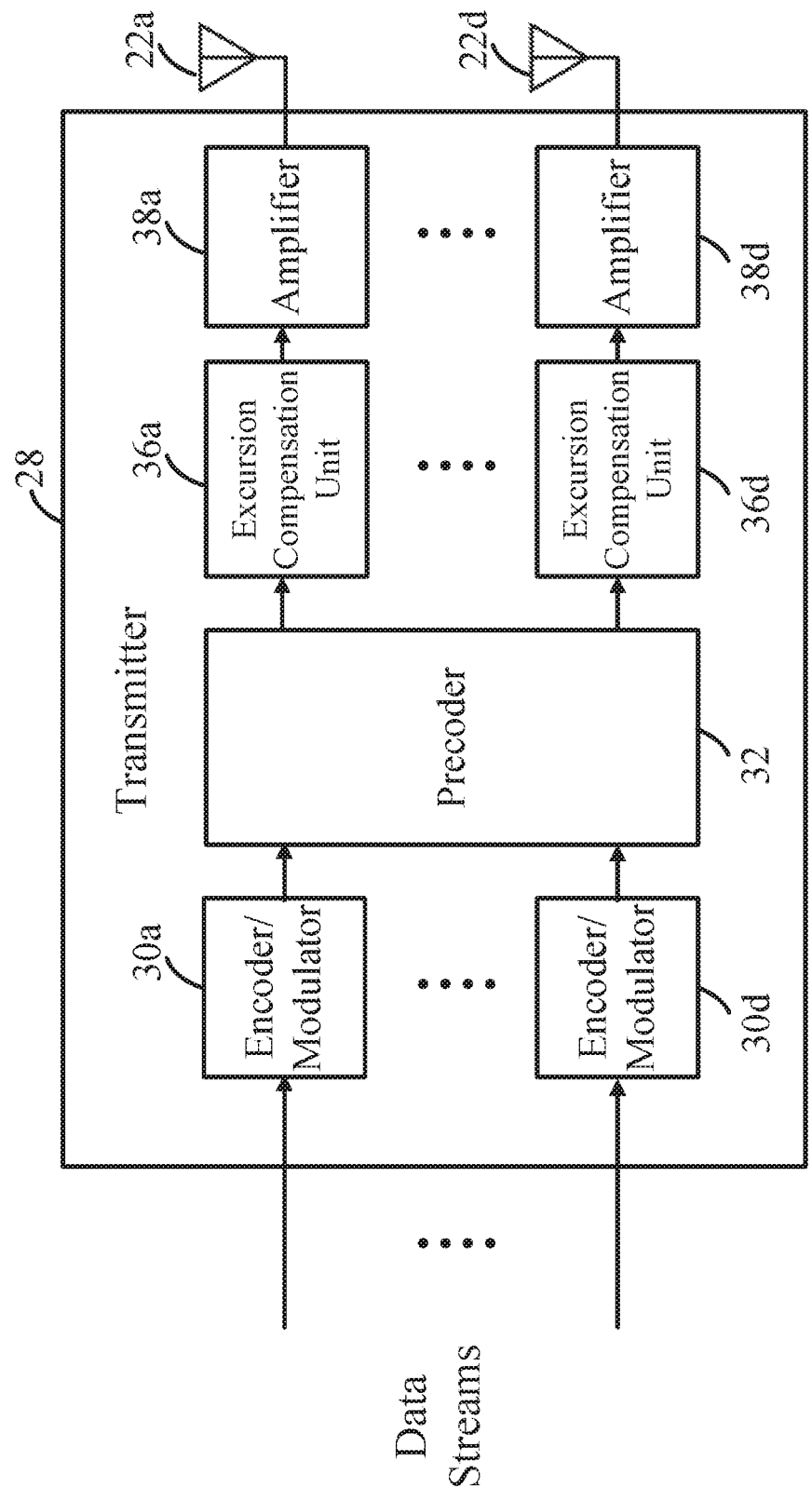

Example FIG. 4 illustrates a multi-antenna transmitter with a precoder, in accordance with embodiments.

Figure 5A:
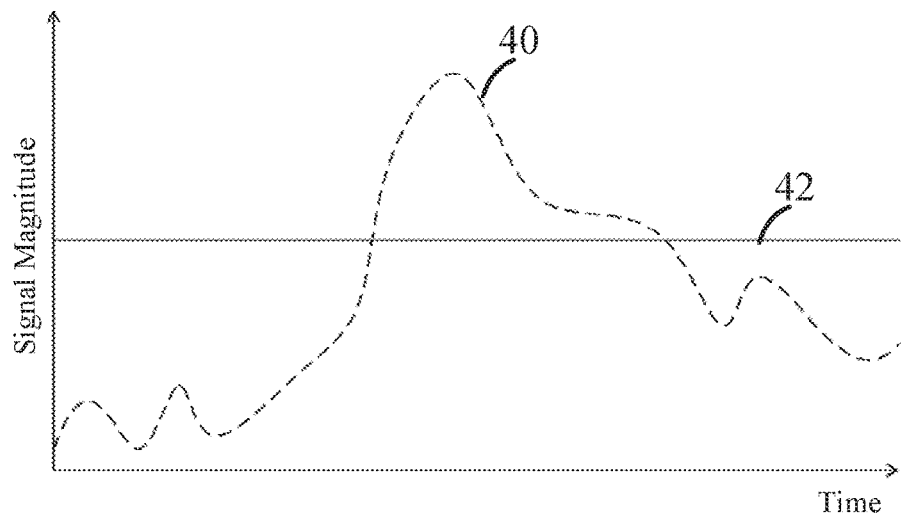
Figure 5B:
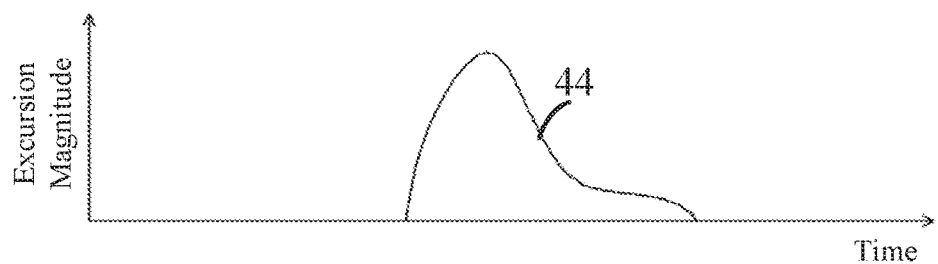
Figure 5C:
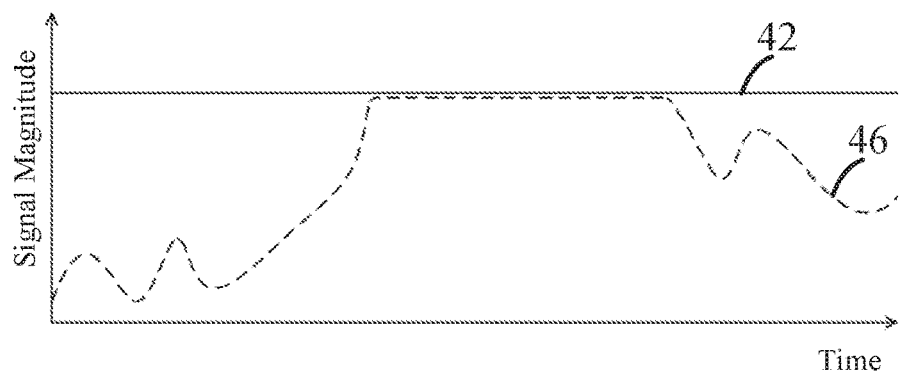

Example FIGS. 5A-5C illustrate time domain transmission signals that are excursion compensated at a multi-antenna transmitter, in accordance with embodiments.

Figure 6A:
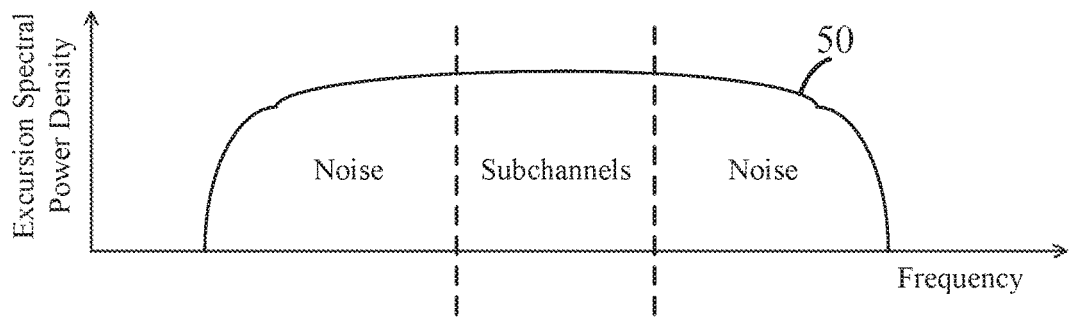
Figure 6B:
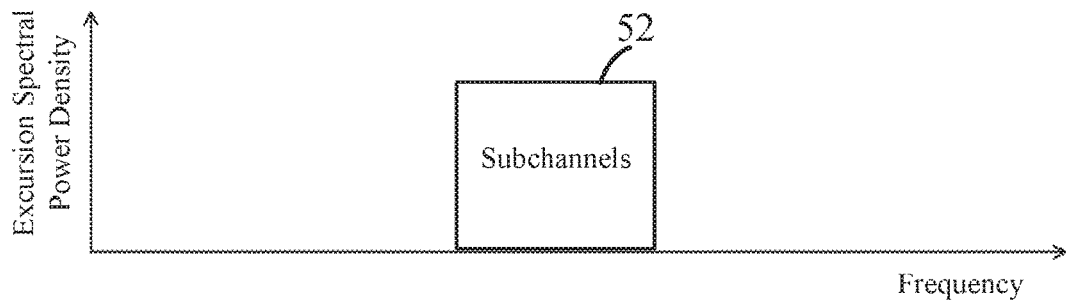
Figure 6C:
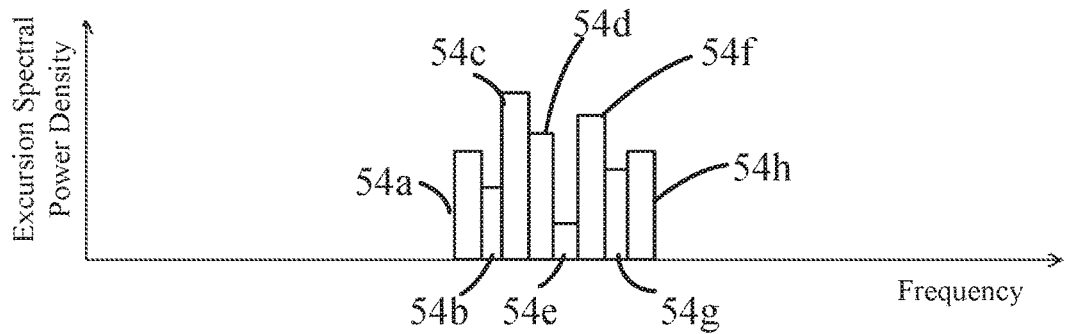

Example FIGS. 6A-6C illustrate frequency domain signals that are subject to excursion compensation processing at a multi-antenna transmitter, in accordance with embodiments.

Figure 7:
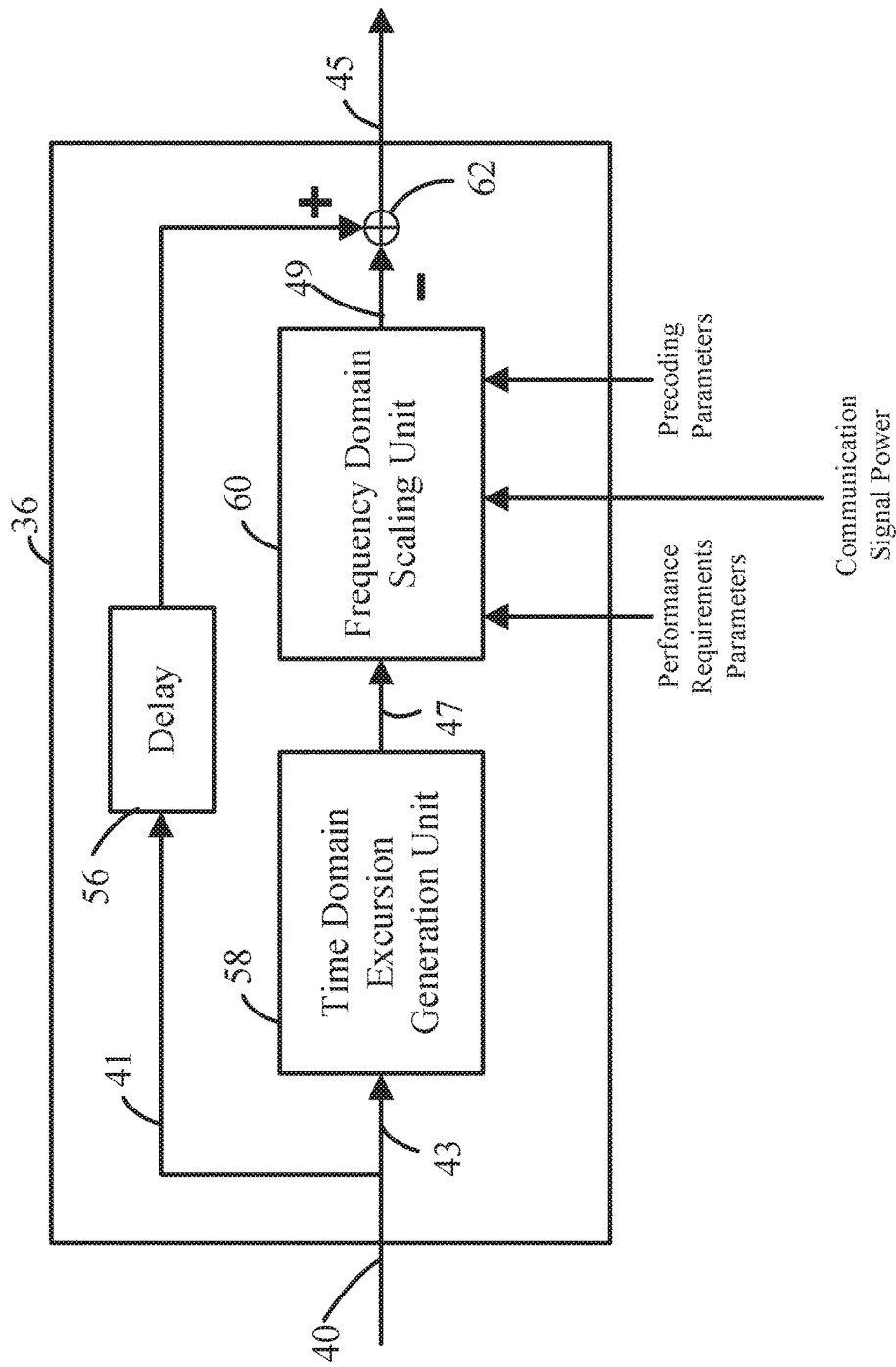

Example FIG. 7 illustrates an excursion compensation unit in a multi-antenna transmitter, in accordance with embodiments.

Figure 8:
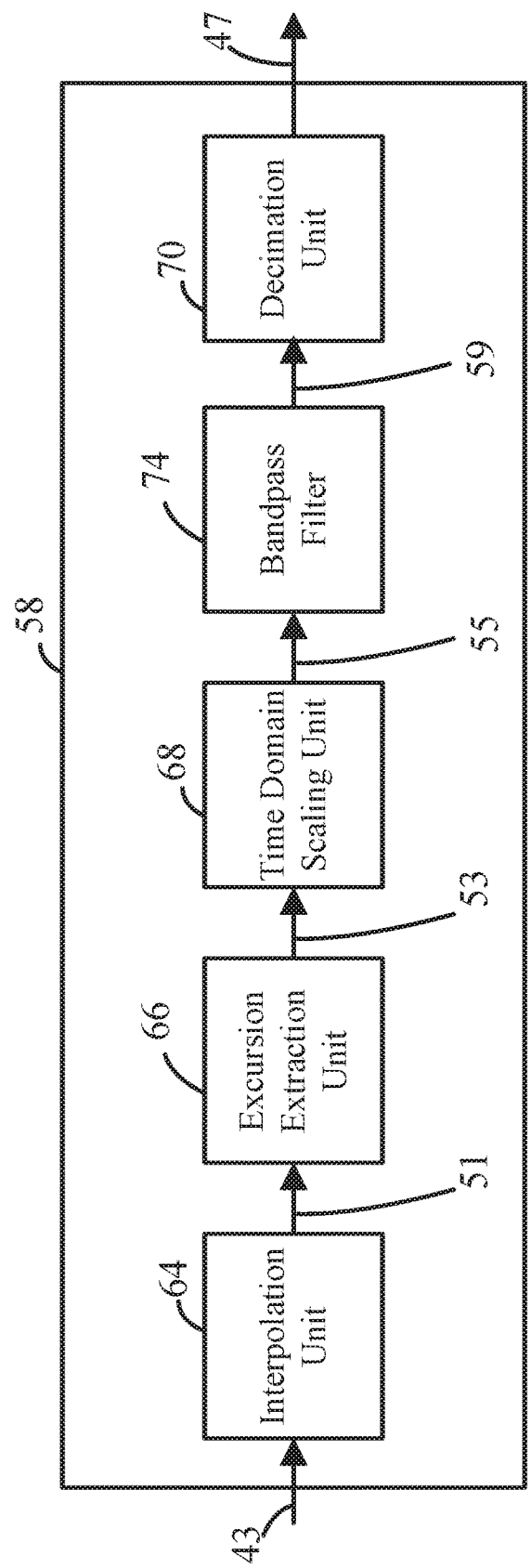

Example FIG. 8 illustrates an excursion generation unit as part of a multi-antenna transmitter, in accordance with embodiments.

Figure 9:
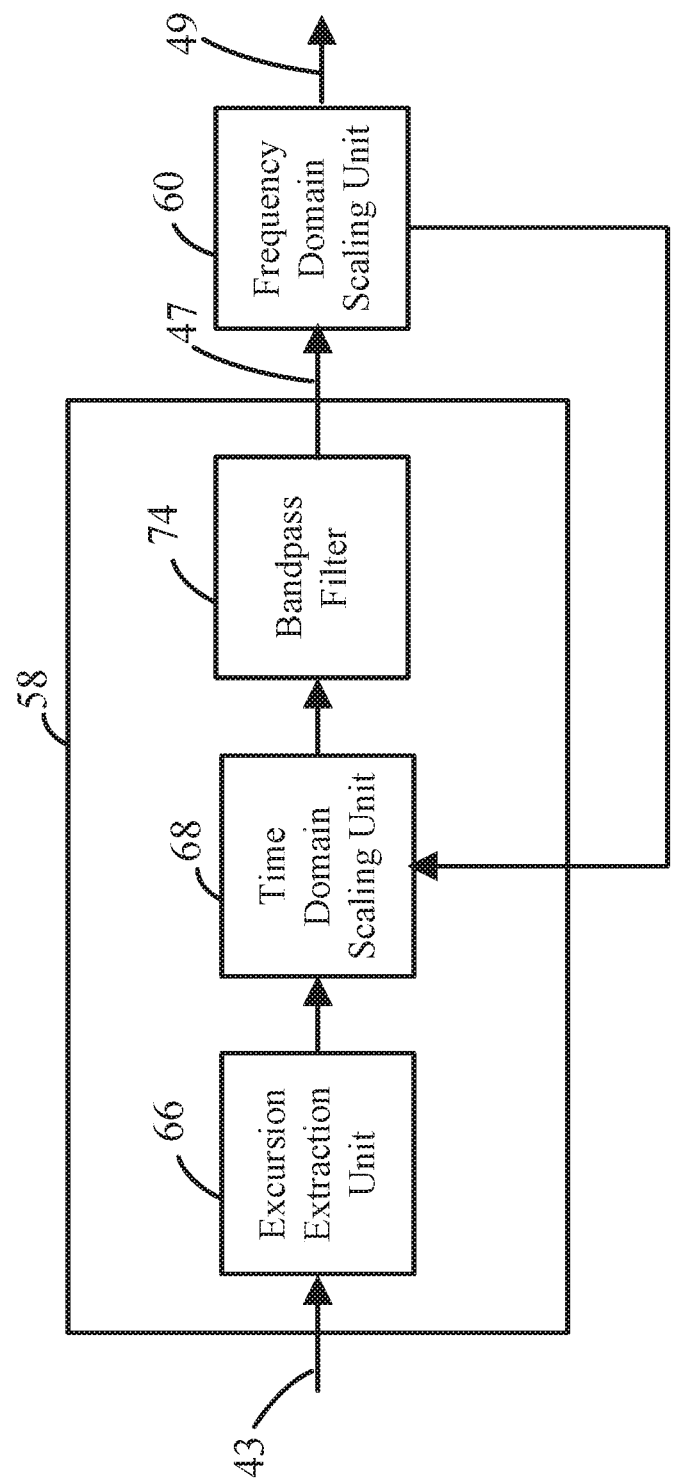

Example FIG. 9 illustrates an excursion generation unit that scales a precoded communication signal in the time domain based on feedback from a frequency domain scaling unit, in accordance with embodiments.

Figure 10:
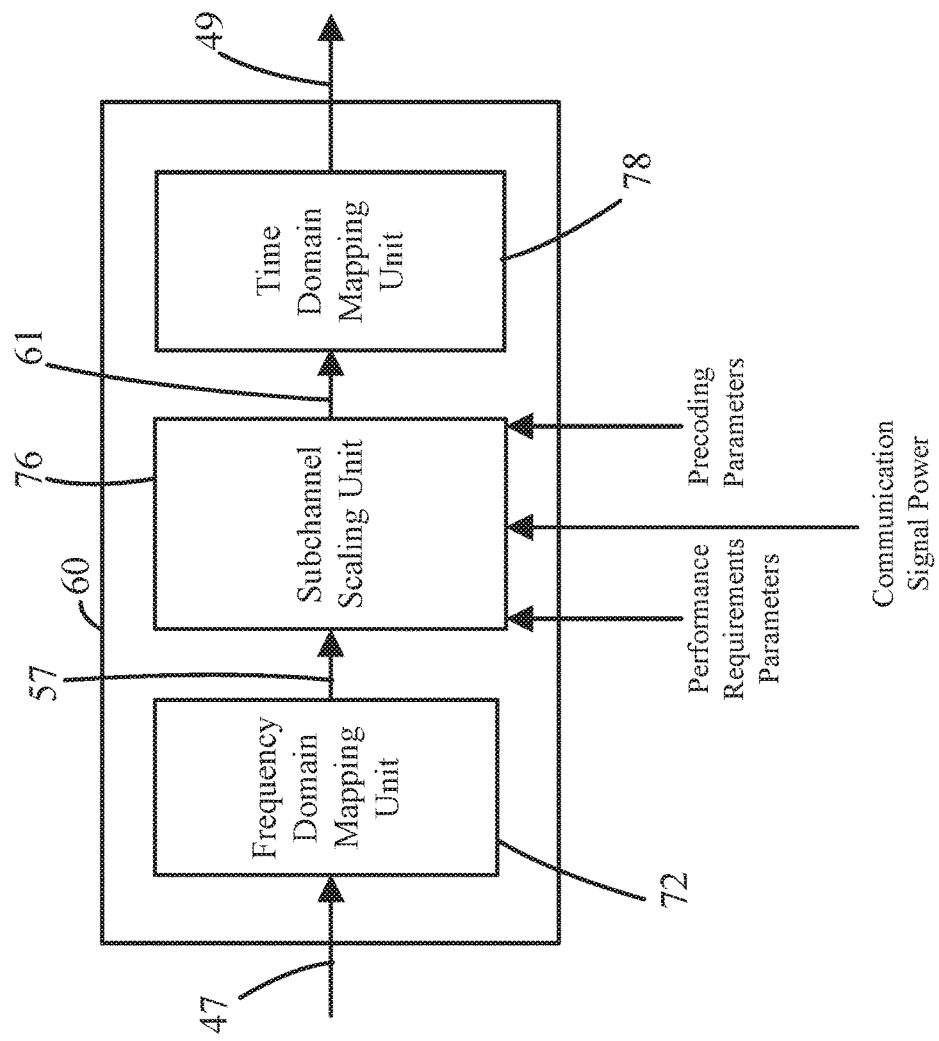

Example FIG. 10 illustrates a frequency domain scaling unit, in accordance with embodiments.

DESCRIPTION

Example FIG. 1 illustrates a communications network 10, in accordance with embodiments. Communications network 10 may be a wireless network, although embodiments are not limited to wireless networks. The communications network 10 illustrated in FIG. 1 is merely exemplary for illustrative purposes and is not intended to limit embodiments. Communications network 10 may be a mobile telephone network that services mobile phones 12a, 12b, 14a, and 14b. Mobile phones 12a and 12b may be in wireless communication with base station 18. Likewise, mobile phones 14a and 14b may be in wireless communication with base station 20. Base station 18 and base station 20 may be coupled to network 16, which may be a wired network, optical network, wireless network, or any other communication network as is appreciated by those of ordinary skill in the art. Other communication devices (e.g. computers, landline telephones, servers, data centers, etc.) may be coupled to network 16, as is appreciated by those of ordinary skill in the art.

In embodiments, by wireless communication between mobile phones 12a, 12b, 14a, and 14b with base stations 18 and 20, mobile phones 12a, 12b, 14a, and 14b may have access to network 16 and any resources coupled to network 16. For example, resources coupled to network 16 may include voice communications and/or data communications as is appreciated by those of ordinary skill in the art. Communication between mobile phones 12a, 12b, 14a, and 14b with base stations 18 and 20 may be engineered for communication reliability and/or efficiency.

Example FIG. 2 illustrates base station 18 in wireless communication with mobile phone 12, in accordance with embodiments. In embodiments, base station 18 and mobile phone 12 may be wirelessly communicating in a long-term evolution (LTE) communication system implementing multiple-in multiple-out (MIMO) configurations. For example, an LTE communication system implementing MIMO may be configured to have four antennas 22a through 22d at base station 18 and two antennas 24a and 24b at mobile phone 12. One of ordinary skill in the art will appreciate that embodiments may be implemented in other MIMO communication systems or multipath communication systems that utilize any number of antennas at a transmitter (e.g. base station 18) and any number of antennas at a receiver (e.g. mobile phone 12). One of ordinary skill in the art would appreciate that embodiments are not limited to a mobile telephone communication system, base stations, and/or mobile phones. Base station 18 and mobile phone 12 are merely examples of devices that include transmitters and receivers. However, for the simplicity of illustration, the following detailed description uses mobile phones and base stations with arbitrary number of antennas as illustrative examples without limiting the scope of the embodiments to other multipath communication systems.

As illustrated in example FIG. 2, there are two wireless paths from antenna 22a of the base station 18 to antennas 24a and 24b of mobile phone 12. Likewise, there are multiple paths from each of antennas 22b, 22c, and 22d of base station to antennas 24a and 24b of mobile phone 12. Although these wireless paths are illustrated as direct wireless paths, those skilled in the art appreciate that these paths may be indirect (e.g. reflecting off of items in the surrounding environment such as buildings, geography, vehicles, people, etc.). Further, since all of the wireless paths illustrated between base station 18 and mobile phone 12 are transmitting the same band of frequencies, there is interference between the multiple wireless signals. As those of ordinary skill in the art appreciate, since MIMO communication systems selectively precode the wireless signals that travel by the multiple wireless paths between base station 18 and mobile phone 12, destructive interference between the multiple wireless signals may be minimized and/or otherwise manipulated.

Example FIG. 3 illustrates simplified aspects of base station 18 that are necessary for transmission of communication signals, in accordance with embodiments. Base station 18 may include data processor 26 and transmitter 28. Data processor 26 may receive data from network 16 and organize the received data to provide data streams to transmitter 28. For example, base station 18 may service a plurality of mobile phones in a cell of a wireless communication network. Data processor 26 may receive data to be communicated to the plurality of mobile phone and arrange the data into data streams to be transmitted by transmitter 28. For simplicity of illustration, data processor 26 may perform data layer processing for base station 18 and transmitter 28 may perform physical layer processing for base station 18. However, in embodiments, data processor 26 may also perform physical layer processing or transmitter 28 may also perform data layer processing, as the functions of data processor 26 and transmitter 28 may be intertwined. Transmitter 28 may provide electrical signals to antennas 22a through 22d for MIMO communication. Although example FIG. 3 illustrates aspects of base station 18, these aspects (e.g. data processor 26 and transmitter 28) are also applicable to any other kind of communication device.

Example FIG. 4 illustrates transmitter 28, which may be implemented in any multi-antenna wireless device, in accordance with embodiments. Data streams may be received by transmitter 28 in a variety of forms. For example, data streams input into transmitter 28 may be the output of a demultiplexer that divides a single higher bit rate data stream into a plurality of lower bit rate data streams. In embodiments, the demultiplexing of data streams may be performed inside transmitter 28 or outside of transmitter 28 without departing from embodiments. For illustrative purposes, transmitter 28 is shown receiving multiple data streams, although in configurations the multiple data streams could be generated inside transmitter 28 without departing from the scope of embodiments. As examples, data streams input into transmitter 28 may be a plurality of different data streams from different sources and/or be a product of a demultiplexed higher bit rate data stream into a plurality of lower bit rate data streams, as appreciated by those of ordinary skill in the art. The number of data streams input into transmitter 28 may equal the number of antennas 22*a* through 22*d* used by transmitter 28.

In embodiments, each of the data streams input into transmitter 28 may be encoded and/or modulated by encoders/modulators 30*a* through 30*d*. Embodiments are not limited to any specific number of encoders or modulators, although the number of encoders or modulators may match the number of antennas 22*a* through 22*d* used by transmitter 28. For illustrative purposes, FIG. 4 illustrates four sets of encoder/modulators 30*a* through 30*d* associated with four antennas 22*a* through 22*d* of transmitter 28 (e.g. a four antenna MIMO base station).

In embodiments, encoders/modulators 30*a* through 30*d* may each include an encoder. An encoder may be a device, circuit, transducer, software program, algorithm, and/or combination thereof that convert information from one format or code to another for the purposes of standardization, speed, bit-error mitigation and/or compression. For the purposes of illustration, encoders of encoders/modulators 30*a* through 30*d* are illustrated as part of transmitter 28. Encoder functionality may be included in data processor 26, as appreciated by one of ordinary skill in the art. One of ordinary skill in the art would appreciate that encoding of data may be implemented in a variety of ways prior to the encoded data being modulated and may be implemented through a plurality of processes. In embodiments, some of the encoding of data may be implemented in an encoder and some of the encoding of data may be implemented in a modulator. One of ordinary skill in the art would appreciate that encoding may be performed separate or in conjunction with modulation without departing from the scope of embodiments.

In embodiments, encoders/modulators 30*a* through 30*d* may each include a modulator. A modulator may vary one or more properties of a carrier signal with information from input information signals. Information signals input into encoders/modulators 30*a* through 30*d* may encode and modulate the data streams into a plurality of subchannels that are frequency division multiplexed. For example, in LTE wireless communication systems, downlink subchannels (e.g. communication signals from base station 18 to mobile phone 12) may be modulated using orthogonal frequency division multiple access (OFDMA), while uplink subchannels (e.g. communication signals from mobile phone 12 to base state 28) may be modulated using single carrier frequency division multiple access (SC-FDMA). However, OFDMA and SC-FDMA are just two examples of a frequency division multiplexed modulation methods that modulate information signals into a plurality of frequency distinguishable subchannels. Embodiments relate to any communication system that implements subchannels during modulation. Embodiments may be implemented in Wi-Fi wireless communication systems, WiMAX wireless communication systems, HSPA+ wireless communication systems, or any other wireless communication system, wired communication system, or optical communication system that manipulates multipath propagation of communication signals.

Encoders/modulators 30*a* through 30*d* may output a plurality of communication signals to precoder 32, where each of these communication signals includes a plurality of frequency distinguishable subchannels. Although encoders/modulators 30*a* through 30*d* may be functionally and/or effectively separate from each other, precoder 32 implements precoding algorithms to each of the signals input into precoder 32 from encoders/modulators 30*a* through 30*d* that effectively mixes these signals in a manner that manipulates multi-path characteristics. In each of encoders/modulators 30*a* through 30*d*, the plurality of communication signals may each be modulated into a plurality of frequency domain subchannels, with each subchannel having its own frequency spectrum. For example, in LTE communication systems, downlink communication signals may be modulated using orthogonal frequency division multiple access (OFMDA) with a plurality of parallel subchannels distinguishable by their carrier frequency. Likewise, in LTE communication systems, uplink communication signals may be modulated using single carrier frequency division multiple access (SC-FDMA) also with a plurality of parallel subchannels distinguishable by their carrier frequency.

Each of the individual frequency domain subchannels comprising each of the time domain communication signals input into precoder 32 may have its own performance requirements parameters. As appreciated by those skilled in the art, performance requirement parameters may vary from one communication symbol (e.g. a frequency division multiplexed symbol) to the next, reflecting different combinations of modulation and coding in each subchannel. For example, in LTE wireless communication systems, error vector magnitude (EVM) specifications may dictate performance of a digital radio transmitter or receiver. Noise, distortion, spurious signals, and/or phase noise all degrade performance of a digital radio transmitter or receiver. The EVM specification constrains the short-term average ratio of the composite noise to signal power, as measured in the corresponding sub channel at the receiver to be less than or equal to the EVM specified value. System operators and equipment manufacturers set performance requirements parameters (e.g. EVM specifications in LTE communication systems) in order to qualify equipment (e.g. base stations and mobile phones) which may be used on a network. Specifically, EVM specifications provide a comprehensive measure of the quality of the radio transmitter for use in digital communications. Since wireless networks should be designed to operate in predictable and dependable ways, quality standards (e.g. performance requirements parameters) should be implemented for network quality control purposes. Wireless service providers and wireless equipment manufacturers should only use equipment that satisfies performance requirements parameters, since these performance requirements parameters are central to the overall communication network design and/or dependability of a network to customers.

Particular to MIMO communication systems or other multipath communication systems, each of the encoders/modulators 30*a* through 30*d* may have the same set of frequency distinguishable subchannels that will ultimately be transmitted at the same time from antennas 22*a* through 22*d*. For example, a subchannel modulated at frequency $f_n$ in each of encoders/modulators 30*a* through 30*d* may be transmitted through antennas 22*a* through 22*d* at the same time. In order to avoid destructive interference at frequency $f_n$, precoder 32 selectively mixes each of the subchannels modulated at frequency $f_n$ such that each of the signals transmitted from antennas 22 through 22*d* at frequency $f_n$ do not cumulatively destructively interfere with each other. Without precoding performed in precoder 32, the parallel subchannels modulated at $f_n$ by encoders/modulators 30*a* through 30d would destructively interfere with each other and a wireless communication link could not be practically established. However, through the precoding performed by precoder 32, the multipath characteristics may be manipulated such that destructive interference is not only avoided, but the multipath characteristics of the wireless environment are exploited to increase the amount of data that can be wirelessly communicated between a transmitter (e.g. base station 18) and receiver (e.g. mobile phone 12) that both have multiple antennas.

However, each of the subchannels at frequency $f_n$ output from encoders/modulators 30a through 30d and input into precoder 32 may have different performance requirements parameters. For instance, a specific subchannel of the encoded/modulated signal output from encoder/modulator 30a may have been subjected to QPSK modulation, while the corresponding subchannel of the encoded/modulated signal output from encoder/modulator 30b may have been subjected to 16-QAM modulation, which may each have different performance requirements parameters (e.g. EVM specifications) in an LTE communication system. Accordingly, each communication signal output from precoder 32 into excursion compensation units 36a through 36d may have a mix of performance requirements parameters in each signal.

In a MIMO communication system, precoder 32 may selectively modify or precode the plurality of communication signals to generate a plurality of parallel precoded communication signals. Each of these parallel precoded communication signals will be a selective mix of all of the communication signals output from encoders/modulators 30a through 30d. The selective precoding of the plurality of communication signals exploit multipath propagation from a plurality of antennas of a transmitter (e.g. antennas 22a through 22d) to a plurality of antennas at a receiver (e.g. antennas 24a and 24b of mobile phone 12 illustrated in FIG. 2). Ordinarily, transmitting a plurality of data signals simultaneously on overlapping radio frequency spectrums would cause destructive interference between the subchannels that degrade wireless communication performance. However, in MIMO or other multipath communication systems, by selectively precoding the communication signals at precoder 32, beamforming and/or diversity characteristics may be manipulated to increase the overall wireless communication capacity and/or efficiency. For this reason, LTE communication systems require MIMO communication between base stations 18 and 20 and mobile phones 12a, 12b, 14a, and 14b, which relates to non-limiting example embodiments.

As appreciated by those skilled in the art, selective mixing of the communication signals at a transmitter (e.g. base station 18) is performed according to parameters of a V matrix and selective un-mixing (e.g. post-processing and/or receiver shaping) of received communication signals at a receiver (e.g. mobile phone 12) is performed according to parameters of a $U^H$ matrix. As appreciated by those skilled in the art the $U^H$ matrix is the Hermitian form (i.e. the conjugate transpose) of a U matrix. The U and V matrices are unitary matrices, meaning that the product of either matrix with its Hermitian form equals the identity matrix. The Hermitian form of the V matrix is the $V^H$ matrix. The V matrix and the $U^H$ matrix may be optimized based on the multipath wireless environment between the transmitter and receiver. The multipath wireless environment between the transmitter and receiver may be represented as the H matrix. The H matrix is used to determine the parameters of the V matrix and $U^H$ matrix used for mixing and un-mixing multi-antenna communication signals transmitted over the same subchannel frequency $f_n$. Using the V matrix and the $U^H$ matrix, signals that are transmitted through multiple antennas using the same subchannel frequency $f_n$ do not destructively interfere with each other. In fact, using the parameters of the V matrix and the $U^H$ matrix, the multipath wireless environment between the transmitter and receiver (represented by the H matrix) may be manipulated to accomplish higher data transmission throughput at a lower overall transmission power.

The V matrix may be represented as $$\begin{bmatrix} v_{11} & \cdots & v_{1M} \\ \vdots & \ddots & \vdots \\ v_{M1} & \cdots & v_{MM} \end{bmatrix},$$

where M is the number of antennas at the transmitter. The U matrix may be represented as $$\begin{bmatrix} u_{11} & \cdots & u_{1N} \\ \vdots & \ddots & \vdots \\ u_{N1} & \cdots & u_{NN} \end{bmatrix},$$

wherein N is the number of antennas at the receiver. The H matrix may be represented as $$\begin{bmatrix} h_{11} & \cdots & h_{1M} \\ \vdots & \ddots & \vdots \\ h_{N1} & \cdots & h_{NM} \end{bmatrix},$$

where M is the number of antennas at a transmitter and N is the number of antennas at a receiver. In some MIMO systems, the following matrix equation describes a unique decomposition of an arbitrary H matrix into component matrices (e.g. $H=U\Lambda V^H$, where the $\Lambda$ matrix has zero values for all non-diagonal entries).

For example, in an LTE communication system with a base station 18 having four antennas, the V matrix used to transmit from the base station is a four by four matrix $$\begin{bmatrix} v_{11} & v_{12} & v_{13} & v_{14} \\ v_{21} & v_{22} & v_{23} & v_{24} \\ v_{31} & v_{32} & v_{33} & v_{34} \\ v_{41} & v_{42} & v_{43} & v_{44} \end{bmatrix}.$$

Each parameter of the V matrix (i.e. $v_{11}$ to $v_{mm}$) is determined and/or estimated for the optimum precoding to manipulate the multipath characteristics between the transmitter (e.g. base station 28) and receiver (e.g. mobile phone 12). Each parameter of the V matrix may be a complex value with a real component and an imaginary component. Since these multipath characteristics are continually changing (i.e. the H matrix is continually changing), the parameters of the V matrix are also continually changing.

Since the physical characteristics of the multipath radio environment between the transmitter and receiver are frequency specific, there is a separate V matrix for each frequency distinguishable subchannel modulated by encoders/modulators 30a through 30d. In other words, subchannels of the same frequency $f_n$ output from encoders/modulators 30a through 30d are all precoded using that same V matrix at precoder 32, even though each of these subchannels embodies different data streams (which may have different performance requirements parameters). The reason that subchannels having the same frequency $f_n$ that are transmitted in parallel through antennas 22a through 22d should be precoded using the same V matrix is because the V matrix precodes, modifies, and/or mixes together the modulated communication signals output from encoders/precoders 30a through 30d such that the subchannels will not destructively interfere with each other in the multipath communication environment. In other words, if there is no coordinated precoding between the overlapping frequency distinguishable subchannels, then these subchannels will interfere with one another.

Precoding at precoder 32 actually increases the capacity and/or performance of the wireless communication link between a transmitter and receiver by using a V matrix that is specific to a subchannel carrier frequency $f_n$ which is used by all of the frequency distinguishable subchannels transmitted in parallel through antennas 22a through 22d. In other words, without precoder 32, the signal output from encoder/modulator 30a would be transmitted through only antenna 22a. However, with precoding by precoder 32, the signal output from encoder/modulator 30a is mixed together with the signals output from encoders/modulators 30b through 30d and transmitted through all of antennas 22a through 22d. Although the signal output from encoder/modulator 30a is transmitted through all of antennas 22a through 22d, this signal is modified according to the V matrix when it is mixed with the signals output from encoders/modulators 30b through 30d. Since the parameters of the V matrix have both real and imaginary components, the selective mixing at precoder 32 may be accomplished such that multipath characteristics between a transmitter and receiver are manipulated for higher throughput and destructive interference of signals is avoided.

In embodiments, the multipath characteristics at a given frequency between a transmitter (e.g. base station 32) and a receiver (e.g. mobile phone 12) may be mathematically characterized as an H matrix. These parameters of the H matrix may be represented as $$\begin{bmatrix} h_{11} & \cdots & h_{1M} \\ \vdots & \ddots & \vdots \\ h_{N1} & \cdots & h_{NM} \end{bmatrix},$$

where M is the number of antennas at the transmitter and N is the number of antennas at the receiver. Each of the parameters of the H matrix may be a complex value having a real component and an imaginary component. A communication system may dynamically determine or estimate (directly or indirectly) the parameters of the H matrix for each frequency subchannel through processes appreciated by those skilled in the art. From the determined parameters of the H matrix, a communication system may derive and/or estimate a V matrix for each subchannel frequency, which are the substantially ideal parameters to selectively precode the subchannels output from encoders/modulators 30a through 30d in order to effectively manipulate the multipath characteristics of a communication system. Since the environment of a communication system is dynamically changing, the H matrix is continually changing, which causes changes in the V matrix for each frequency distinguishable subchannel.

For example, a communication system may transmit pilot tones over a plurality of frequency domain subchannels from multiple antennas of a transmitter (e.g. base station 32 having four antennas). As appreciated by those skilled in the art, subchannels may be partitioned into subsets which transmit either data or pilot tones which are propagated in multipath from the transmitter to a receiver (e.g. mobile phone 12 having two antennas). The measured distortions of the interfering pilot tones may be used to derive, periodically update and/or otherwise determine the parameters of the H matrix. In embodiments, the parameters of the H matrix may be a mathematical model of the multipath radio environment between the transmitter and receiver. These pilot tones may be transmitted periodically between the transmitter and receiver to accommodate for the dynamically changing radio wave multipath characteristics between the transmitter and receiver. Since the multipath characteristics are frequency dependent, there is a different H matrix for each of the frequency domain subchannels. Accordingly, precoder 32 implements dynamically changing V matrices for each of the frequency distinguishable subchannels modulated in the encoders/modulators 30a through 30d. Each of the subchannel frequencies for each of the communication signals input into the precoder 32 are precoded according to the same V matrix associated with that subchannel.

Between a transmitter and receiver, the radio signals propagated from the multiple antennas of the transmitter may interfere with one another and may be received by multiple antennas of the receiver. Since these radio signals are precoded, the interference between the radio signals is not cumulatively destructive and may be post processed in order to recover and/or reconstruct the original communication signals input into the precoder 32 at the transmitter 28, as appreciated by those of ordinary skill in the art. Such post processing may be accomplished by the $U^H$ matrix at a receiver, which is complementary to the V matrix and also derived and/or estimated from the H matrix, as is appreciated by those of ordinary skill in the art.

The net effect of transmitter precoding (using the V matrix) at the transmitter and receiver shaping (using the $U^H$ matrix) is that the destructive interference between distinct signal paths may be effectively eliminated. A receiver shaping operation may generate a set of parallel sample streams, each of which is proportional to its respective transmitter precoding input sample stream. Each of the parallel sample streams conveys data using modulation and coding associated with this path and each distinct subchannel within each frequency division multiplexed symbol. Performance requirements parameters (e.g. EVM specifications) may limit the amount of noise power which the transmitter may generate in each such received subchannel, depending on the specific combination of modulation (e.g. QPSK, 16QAM, or other modulation types) used to convey information in that subchannel. Compliance with performance requirements parameters may demand that any noise (e.g. excursion noise) generated at the transmitter exhibits a short-term average power relative to the modulated signal power in that same subchannel in compliance with the performance requirements parameters. That is, the performance requirements parameters for each signal path may require control of transmitter noise, as it will be measured at the receive shaping output, rather than at any point in the transmitter.

The output of encoders/modulators 30a through 30d may each have a plurality of frequency division multiplexed subchannels over the same transmission spectrum. For example, each of encoders/modulators 30a through 30d may output a subchannel at frequency $f_n$, which are destined to be transmitted from antennas 22a through 22d. For LTE wireless communication systems there may be hundreds or thousands subchannels in a OFDMA or SC-FDMA modulated signal, each having its own carrier frequency $f_n$. Without precoder 32, if these multiple subchannels were transmitted through antennas 22a through 22d, then the competing signals at frequency $f_n$ would destructively interfere with each other, thus making a multi-antenna communication system impractical to implement. However, by using precoder 32, a dynamically changing V matrix is applied to each corresponding subchannel at frequency $f_n$ output from encoders/modulators 30a through 30d to selectively mix the subchannels in a way that substantially avoids destructive interference and actually manipulates the multipath radio environment to increase throughput. Accordingly, there are as many V matrices applied in precoder 32 as there are frequency domain subchannels modulated by each of the plurality of encoders/modulators 30a through 30d. These V matrices are dynamically changing with changes in the multipath environment between the transmitter and receiver and are regularly updated using processes appreciated by those skilled in the art.

As a simplified example of the dynamically changing natures of the V matrices, if a user of mobile phone 12 moves the mobile phone 12 from one position to another position, the multipath characteristics of the wireless paths between the base station 32 and the mobile phone 12 change, since the paths through which the radio waves change between transmitting antennas 22a through 22d and receiving antennas 24a and 24b. As these multipath characteristics change, the H matrix representation for each of the frequency distinguishable subchannels changes. Such changes to the H matrix may be periodically determined by the use of pilot tones. As the communication system updates the H matrix for each of the frequency distinguishable subchannel $f_n$, the associated V matrix (at the transmitter) and $U^H$ matrix (at the receiver) for that subchannel frequency $f_n$ is also periodically updated. Accordingly, the parameters of the selective precoding reflected by the V matrices dynamically changes over time as a reflection of changes in the multipath characteristics. Since the multipath characteristics that contribute to the V matrix are frequency dependent, each frequency subchannel has its own V matrix, although each of encoders/decoders 30a through 30d uses the same V matrix for each frequency distinguishable subchannel, since subchannels at the same frequency $f_n$ are selectively mixed by precoder 32.

In some communication systems, the communication signals input into precoder 32 have performance requirements parameters. For example, in LTE wireless communication systems, performance requirements parameters may be error vector magnitude (EVM) specifications, which constrain the maximum value of the ratio of total noise to signal power in any subchannel as measured at the output of the corresponding receiver demodulator. These EVM specification values may be defined based on the combination of modulation order and error-correction coding rate used by any transmitter modulator. For example, the performance requirements parameters may be a parameter that limits the amount of noise in a communication signal recovered in a receiver (e.g. after post processing) compared to the original communication signal input into the precoder 32. For example, these parameters may be predefined as a permissible noise percentage of the data signal strength of the subchannels output from encoders/modulators 30a through 30e compared with these reconstructed channels in a receiver (e.g. after post processing). In LTE communications systems, these performance requirements parameters may be derived directly or indirectly from error vector magnitude (EVM) specifications that are regulated as preconditions for devices to operate on an LTE communication network. EVM specifications or any other type of network specific performance requirements parameters may be implemented in any type of communication network. Different performance requirements parameters may be implemented based the type of encoding and/or modulation of a communication signal.

In embodiments, performance requirements parameters may be expressed in terms of the maximum allowable ratio of the total transmitter noise power to signal power of a communication signal input into precoder 32 where noise and signal power values as measured at the corresponding receiver subsequent to a $U^H$ matrix operation which eliminates destructive inference between distinct signal paths. Since the excursion noise generated by excursion compensation processing may exceed transmitter noise generated by any other transmitter noise mechanism (e.g. oscillator phase noise), embodiments consider only the excursion noise generated by excursion compensation relative to performance requirements parameters. In embodiments, non-transmitter noise sources may be accommodated by other mechanisms. In embodiments related to LTE communication systems, this maximum ratio may be expressed as a percentage value in the EVM specifications. In embodiments, the performance requirements parameters may be represented by an E matrix $$\begin{bmatrix} \eta_1 \\ \vdots \\ \eta_M \end{bmatrix},$$

where M is the number of antennas at the transmitter. The error vector magnitude specifications (as one example embodiment of performance requirements parameters) are based on the combination of modulation order and error-correction coding rate of the plurality of communication signals input into the precoder 32. Parameters $\eta_1$ through $\eta_M$ are maximum short-term average ratios of the total transmitter induced noise to signal power in any subchannel of the plurality of communication signals as measured at the output of the corresponding demodulator at a receiver on a scale from 0 to 100.

Performance requirements parameters (e.g. EVM specifications) may ensure suitable interoperability of standards based transmitter and receiver products by limiting the total noise which the transmitter may generate. Such noise degrades the bit-error-rate over each subchannel link, with the amount of degradation dependent upon the specific combination of modulation and coding used to convey data over the link established by each specific subchannel. Performance requirements parameters (e.g. EVM specifications) may be defined in terms of combinations of modulation and coding. In the absence of destructive interference, the power loss experienced by any transmitter noise in any subchannel may be approximately the same as the power loss experienced by the modulated and coded signal in that subchannel by propagation over the medium. In other words, in absence of destructive interference, the ratio of added noise to signal power in any subchannel at the transmitter may be approximately the same as the ratio of added noise measured at the output of the receiver shaping. Performance requirements parameters (e.g. EVM specifications) may be defined as ratios measured at the receiver outputs (e.g. receiver demodulator inputs) subsequent to elimination of destructive interference. This may preclude excursion scaling based directly on any physical measurements. In embodiments, in order to perform peak reduction processing to multiple-input multiple-output communication systems, it is necessary to implement excursion scaling indirectly in terms of known and measurable quantities.

In embodiments, the power levels of each respective frequency distinguishable subchannel at the output of encoders/modulators 30a through 3d (e.g. input into precoder 32) may be expressed as P matrix $$\begin{bmatrix} P_1 \\ \vdots \\ P_M \end{bmatrix},$$

where M is the number of antennas 22a through 22d at the transmitter. These power levels of the P matrix are the square of the signal magnitudes of each of the frequency distinguishable subchannels input into precoder 32, as appreciated by those of ordinary skill in the art. For example, the power level for the subchannel at frequency $f_1$ output from encoder/modulator 30a may be the parameter $P_1$ and the power level for the parallel subchannel at the same frequency $f_1$ output from encoder/modulator 30d may be parameter $P_4$.

In embodiments, the performance requirements parameters (e.g. EVM specifications) constraint of a specific subchannel represented by P matrix $$\begin{bmatrix} P_1 \\ \vdots \\ P_M \end{bmatrix}$$

may be expressed by E matrix $$\begin{bmatrix} \eta_1 \\ \vdots \\ \eta_M \end{bmatrix},$$

wherein M is the number of antennas at the transmitter and $\eta_1$ through $\eta_M$ are the square-roots of the ratios of noise to signal powers, expressed as percentages, as appreciated by those of ordinary skill in the art. At any instant, the transmitter may be generating excursion noise in the same subchannel in each distinct signal path. Since the required processing is substantially the same for each path, the E matrix is a simplified representation of the performance requirements parameters (e.g. the maximum allowable ratios of transmitter noise to modulated signal power).

For example, communication signals may ultimately be propagated by antennas 22a through 22d. Prior to the precoded communication signals being propagated by antennas 22a through 22d, these precoded signals need to be amplified by amplifiers 38a through 38d. However, amplifiers 38a through 38d have limitations to the signal power input thereto. Accordingly, the precoded communication signals output from precoder 32 may be excursion compensated by excursion compensation units 36a through 36d prior to being amplified by amplifiers 38a through 38d. Without excursion compensation units 36a through 36d, amplifiers 38a through 38d may not operate efficiently or adequately and may cause a failure in the communication system. For example, if the signal power input into amplifiers 38a through 38d is above a signal magnitude threshold characteristic of amplifiers 38a through 38d, then the amplified precoded communication signals may be amplified non-linearly or at a non-ideal efficiency. If the precoded communication signals are amplified non-linearly, there may be frequency domain aberrations of the amplified precoded communication signals that may cause cross-talk between subchannels, out-of-band transmissions, inefficient power consumption by the amplifiers, and/or other behaviors that render the communication system inoperable and/or inefficient. Without excursion compensation, costly amplifier backoff may need to be implemented in order to prevent an amplifier from operating non-linearly.

FIG. 5A illustrates the magnitude over time of an example precoded communication signal 40 output from precoder 32 and input into one of excursion compensation units 36a, 36b, 36c, or 36d. This example precoded communication signal 40, shown in the time domain, corresponds to a plurality of frequency domain subchannels which were modulated by encoder/modulator 30a, 30b, 30c, or 30d and mixed together in precoder 32. A signal magnitude threshold 42 of corresponding amplifier 38a, 38b, 38c, or 38d indicates the maximum signal magnitude that the amplifier 38a, 38b, 38c, or 38d can handle without exhibiting frequency domain aberrations and/or operating inefficiently. The portion of this precoded communication signal 40 whose magnitude exceeds the signal magnitude threshold of the corresponding amplifier 38a, 38b, 38c, or 38d is an excursion portion of the precoded communication signal 40. Excursion compensation units 36a through 36d are configured to modify the precoded communication signals output from precoder 32 such that the excursion compensated precoded communication signals have a signal magnitude below the signal magnitude threshold level 42 of the corresponding amplifiers 38a through 38d. For example, a precoded communication signal 40 output from precoder 32 (whose magnitude is illustrated in FIG. 5A) may be excursion compensated in excursion compensation unit 36a to output excursion compensated precoded communication signal 46 (whose magnitude is illustrated in FIG. 5C). As illustrated in example FIG. 5C, since the magnitude of the excursion compensated precoded communication signal 46 is below the signal magnitude threshold 42 of the corresponding amplifier, the corresponding amplifier will be able to operate properly and/or operate without costly backoff.

However, when a precoded communication signal output from precoder 32 is excursion compensated by one of excursion compensation units 36a through 36d, noise is inevitably introduced to the subchannels in the frequency domain. This introduced noise cannot exceed the performance requirements parameters of the communication system (e.g. EVM specifications of an LTE communication system, regulatory spectral masks constraining out-of-band transmission energy, etc.). Accordingly, it is not a simple matter of clipping the precoded communication signal 40 (whose magnitude is illustrated in FIG. 5A) in the time domain to produce the excursion compensated precoded signal 46 (whose magnitude is illustrated in FIG. 5C). Since the excursion compensated precoded communication signals are amplified by amplifier 38a through 38d and then propagated by antennas 22a through 22d into a multipath radio environment where there is interference between the subchannel frequencies, the excursion compensation must accommodate for the multipath interference such that the communication signals reconstructed at the receiver after post processing do not have noise that exceeds the performance requirements of the communication system. That is, the composite noise due to excursion compensation at the input to any receiver demodulator/decoder includes a mixture of excursion noise contributions from the plurality of transmitter excursions. In embodiments, the excursion compensation units 36a through 36d must compensate for excursions in the time domain such that the signal magnitude is not greater than the signal magnitude threshold of the associated amplifiers 38a through 38d and also compensate in the frequency domain such that the subchannels satisfy the performance requirements parameters notwithstanding the multipath interference of subchannels propagated at the same frequency from the different antennas 22a through 22d.

Excursion compensation units 36a through 36d should suppress excursions above the signal magnitude threshold of the associated amplifiers 38a through 38d without violating the performance requirements parameters of the communication system (e.g. the error vector magnitude parameters of a LTE communication system). Since performance requirements parameters of a communication system are based upon the communication signals input into the precoder 32, the excursion compensation units 36a, 36b, 36c, and 36d compensate for excursions after the precoding. Accordingly, the excursion compensation must accommodate for scaling in the frequency domain of extracted excursion portions based on a V matrix associated with a particular subchannel frequency.

For example, precoded communication signal 40 (whose magnitude is illustrated in FIG. 5A) may be output from precoder 32 into excursion compensation unit 36a and destined for amplifier 22a. In the time domain, an excursion magnitude portion 44 of precoded communication signal 40 which is greater than the signal magnitude threshold 42 of amplifier 22a may be extracted in the time domain (shown in FIG. 5B). The excursion portion consists of complex values corresponding to magnitude values represented by time domain excursion magnitude portion 44. Excursion magnitude portion 44 may have an example frequency domain profile shown as frequency domain excursion signal 50 (as shown in FIG. 6A).

Because excursion magnitude portion 44 has a value of zero in the time domain for any time period that the magnitude of the precoded communication signal 40 is below the signal magnitude threshold 42 (as shown in FIGS. 5A and 5B), the associated frequency domain excursion magnitude portion 50 will have a frequency spectrum larger than the original bandwidth of the precoded communication signal 40. In other words, since there are portions of the excursion magnitude portion 44 that are zero in the time domain, the frequency characteristics of the excursion magnitude portion 50 may include sideband frequency noise components that are outside of the original frequency domain bandwidth of the precoded communication signal 40. Accordingly, frequency domain excursion signal 50 may be subjected to a bandpass filter to generate frequency domain excursion signal 52 (shown in FIG. 6B) from frequency domain excursion signal 50 which eliminates signals in frequencies that were outside of the original bandwidth of precoded communication signal 40. The frequency spectrum of excursion signal 52 spans and corresponds to all of the frequency domain subchannels that were modulated in encoders/modulators 30a and selectively mixed together by precoder 32, where the excursion magnitude portion 50 corresponded to time intervals where signal magnitudes were greater than the signal magnitude thresholds 42 of the associated amplifiers 38a, 38b, 38c, or 38d. In embodiments, signal magnitude thresholds may be dynamic and/or may be different for each of the amplifiers of the plurality of amplifiers.

The sideband frequencies which were filtered out from frequency domain excursion signal 50 to generate frequency domain excursion signal 52 are noise which should be eliminated from the communication system. When this noise is filtered out by a bandpass filter, a portion of the original signal power of excursion magnitude portion 44 is reduced. In embodiments, time domain scaling of excursion signal 50 prior to mapping to the frequency domain may be implemented to accommodate for the attenuation due to the band pass filtering. In other embodiment, time domain scaling may not be necessary if attenuation due to bandpass filtering is accommodated in the frequency domain scaling of the subchannels.

FIG. 6C illustrates frequency domain scaling of excursion signal 52 of subchannels 54a through 54h. Only eight subchannels 54a through 54h are illustrated for simplicity of explanation. However, communication systems may have tens or hundreds or thousands of subchannels, which are sometimes referred to as subcarriers by those of ordinary skill in the art. The frequency domain scaling of subchannels may be based on the precoding parameters of that subchannel (e.g. the V matrix), the performance requirements parameters of the communication signals input into precoder 32 (e.g. the E matrix), and the power levels of the subchannels input into precoder 32 (e.g. the P matrix). The frequency domain scaled excursion signals 54a through 54h may then be converted back to the time domain into a complex waveform whose magnitude is substantially similar to excursion magnitude waveform 44 (shown in FIG. 5B). In other words, the frequency scaled excursion signal should have time domain characteristics so that when excursion portion 44 is subtracted from the original signal 40, the magnitude of the resulting waveform 46 is below the signal magnitude threshold 42 of an associated amplifier.

The frequency domain scaled excursion signals 54a through 54h (illustrated in example FIG. 6C) should have frequency scaled characteristics which limit the frequency domain noise to permissible levels of a communication signal in accordance with performance requirements parameters. At the same time, the time domain characteristics of the frequency scaled excursion signal 44 must have noise distortions that when subtracted from the original signal 40 allow the amplifier 38a to operate below its magnitude signal threshold 42. Since the subchannels in the precoded communication signals are mixed together by precoder 32 of a MIMO communication system, each subchannel for each precoded communication signal may be scaled to optimal or substantially optimal levels in order to ensure that the performance requirements parameters are satisfied when the signals are reconstructed at the input to corresponding receiver demodulators, so that the amount of noise introduced does not exceed the performance requirements parameters therein imposed. Embodiments relate to the frequency domain scaling of subchannels 54a through 54h such that performance requirements parameters are satisfied and the scaled excursion signal 44 subtracted from precoded communication signal 40 results in an excursion compensated precoded communication signal that is below the signal magnitude threshold 42 of the associated amplifiers 22a through 22d.

In embodiments, the scaled power levels of subchannels 54a through 54h for the frequency domain excursion signal are derived from an S matrix of $$\begin{bmatrix} S_1 \\ \vdots \\ S_M \end{bmatrix}$$

for each of the frequency distinguishable subchannel transmitted by antennas 22a through 22d. The S matrix for each of the overlapping subchannels is determined as a function of the V matrix (i.e. precoding parameter), the E matrix (i.e. performance requirements parameters), and the P matrix (i.e. data power levels of the plurality of communication signals prior to precoding).

For example, in a four antenna transmitter and two antenna receiver MIMO communication system such as that illustrated in FIG. 2, there will be an four by one S matrix $$\begin{bmatrix} S_1 \\ S_2 \\ S_3 \\ S_4 \end{bmatrix}$$

for every subchannel having frequency $f_n$ that are amplified by the four amplifiers 38a through 38d and then transmitted by the four antennas 22a through 22d. Parameter $S_1$ would be the maximum scaled power of a subchannel at frequency $f_n$ of the excursion signal that may be generated by excursion compensation unit 36a without violating the performance requirements parameters (e.g. EVM specifications) of system 10. Likewise, parameters $S_2$, $S_3$, and $S_4$ are the maximum scaled power of the subchannel at frequency $f_n$ of the excursion signals generated by excursion compensation units 36b through 36d without violating the performance requirements parameters (e.g. EVM specifications) of the associated received subchannel noise power levels after the signals have passed through propagation network 16, including receiver MIMO post-propagation processing used to compensate for matrix H.

FIG. 6C illustrates an example scaled frequency domain subchannels output from excursion compensation unit 36a, in accordance with embodiments. Although only eight subchannels 54a through 54h are illustrated for simplicity, those skill in the art will appreciate that any number of frequency distinguishable subchannels are possible (e.g. LTE communication systems can have thousands of subchannels). For the purposes of illustration, subchannel 54a may be at frequency $f_1$, subchannel 54b may be at frequency $f_2$, subchannel 54c may be at frequency $f_3$, subchannel 54d may be at frequency $f_4$, subchannel 54e may be at frequency $f_5$, subchannel 54f may be at frequency $f_6$, subchannel 54g may be at frequency $f_7$, and subchannel 54h may be at frequency $f_8$. S matrix $$\begin{bmatrix} S_1 \\ S_2 \\ S_3 \\ S_4 \end{bmatrix}$$

may be specific to the subchannel at frequency $f_1$, since each S matrix is specific to only one subcarrier frequency $f_n$. Parameter $S_1$ of the S matrix is the power that subchannel 54a is scaled to at the first excursion compensation unit 36a at frequency $f_1$. Likewise, parameters $S_2$, $S_3$, and $S_4$ are the powers that subchannels corresponding to subchannel 54a are scaled to at the second excursion compensation unit 36b, third excursion compensation unit 36c, and fourth excursion compensation unit 36d at frequency $f_1$.

For simplicity of illustration, FIG. 6C only illustrates the frequency domain scaling of multiple subchannels for one of the excursion compensation units 36a through 36d. The S matrix for a given frequency $f_n$ applies to all of the excursion compensation units 36a through 36d, with each parameter $S_1$ through $S_4$ applying to one of the excursion compensation units 36a through 36d at the given frequency $f_n$. Precoder 32 mixes all of the subchannels output from encoders/modulators 30a through 30d at the given frequency $f_n$ using the V matrix to generate hybrid precoded communication signals. These hybrid precoded communication signals may have multiple performance requirements parameters mixed together and spread between the different precoded communication channels that are output from precoder 32. The frequency domain scaled powers of the S matrix for given frequency $f_n$ are determined from the V matrix, the P matrix and the E matrix for a given frequency $f_n$.

In embodiments, the parameters of the S matrix are related to the parameters of the P matrix by the inequality equation $$\begin{bmatrix} |v_{11}|^2 & \cdots & |v_{M1}|^2 \\ \vdots & \ddots & \vdots \\ |v_{1M}|^2 & \cdots & |v_{MM}|^2 \end{bmatrix} \begin{bmatrix} S_1 \\ \vdots \\ S_M \end{bmatrix} \leq \begin{bmatrix} \left(\frac{\eta_1}{100}\right)^2 P_1 \\ \vdots \\ \left(\frac{\eta_M}{100}\right)^2 P_M \end{bmatrix}.$$

This inequality may be derived under the assumption that excursions in the communication system are effectively independent. Although this assumption allows for a solution as to the frequency domain powers to which corresponding subchannels may be scaled, excursions in the communication system may not be rigorously independent. Notwithstanding, assuming that the excursions in the communication system are effectively independent is a practical approximation reflecting the fact that the performance requirements parameters may be defined in terms of short-term average noise powers, justifying the assumptions behind this inequality. In embodiments, the assumption that the excursions are effectively independent presumes that instances where there is significant correlation between the excursion cross-products occur sufficiently rarely that their impact may be ignored.

In the inequality equation $$\begin{bmatrix} |v_{11}|^2 & \cdots & |v_{M1}|^2 \\ \vdots & \ddots & \vdots \\ |v_{1M}|^2 & \cdots & |v_{MM}|^2 \end{bmatrix} \begin{bmatrix} S_1 \\ \vdots \\ S_M \end{bmatrix} \leq \begin{bmatrix} \left(\frac{\eta_1}{100}\right)^2 P_1 \\ \vdots \\ \left(\frac{\eta_M}{100}\right)^2 P_M \end{bmatrix},$$

a modified V matrix is represented as $$\begin{bmatrix} |v_{11}|^2 & \cdots & |v_{M1}|^2 \\ \vdots & \ddots & \vdots \\ |v_{1M}|^2 & \cdots & |v_{MM}|^2 \end{bmatrix}.$$

This modified V matrix may be derived from a calculation of the absolute values squared of a transpose of the parameters of the V matrix $$\begin{bmatrix} v_{11} & \cdots & v_{1M} \\ \vdots & \ddots & \vdots \\ v_{M1} & \cdots & v_{MM} \end{bmatrix}.$$

Although the parameters of the V matrix $$\begin{bmatrix} v_{11} & \cdots & v_{1M} \\ \vdots & \ddots & \vdots \\ v_{M1} & \cdots & v_{MM} \end{bmatrix}$$

are complex values, the parameters of the modified V matrix $$\begin{bmatrix} |v_{11}|^2 & \cdots & |v_{M1}|^2 \\ \vdots & \ddots & \vdots \\ |v_{1M}|^2 & \cdots & |v_{MM}|^2 \end{bmatrix}$$

are real values. Parameters of a $$\begin{bmatrix} \left(\frac{\eta_1}{100}\right)^2 P_1 \\ \vdots \\ \left(\frac{\eta_M}{100}\right)^2 P_M \end{bmatrix}$$

matrix are derived from parameters of the E matrix $$\begin{bmatrix} \eta_1 \\ \vdots \\ \eta_M \end{bmatrix}$$

and the P matrix $$\begin{bmatrix} P_1 \\ \vdots \\ P_M \end{bmatrix}.$$

The scaled powers determined by the S matrix must be less than the calculated amounts, in order to avoid excessive noise in the communication system which would violate the performance requirements parameters governed by the E matrix $$\begin{bmatrix} \eta_1 \\ \vdots \\ \eta_M \end{bmatrix}$$

and the P matrix $$\begin{bmatrix} P_1 \\ \vdots \\ P_M \end{bmatrix}.$$

The modified V matrix is represented as $$\begin{bmatrix} |v_{11}|^2 & \cdots & |v_{M1}|^2 \\ \vdots & \ddots & \vdots \\ |v_{1M}|^2 & \cdots & |v_{MM}|^2 \end{bmatrix}$$

reflects the mixing of the original signals by precoder 32. The inequality equation $$\begin{bmatrix} |v_{11}|^2 & \cdots & |v_{M1}|^2 \\ \vdots & \ddots & \vdots \\ |v_{1M}|^2 & \cdots & |v_{MM}|^2 \end{bmatrix} \begin{bmatrix} S_1 \\ \vdots \\ S_M \end{bmatrix} \leq \begin{bmatrix} \left(\frac{\eta_1}{100}\right)^2 P_1 \\ \vdots \\ \left(\frac{\eta_M}{100}\right)^2 P_M \end{bmatrix}$$

may be solved by a linear programming algorithm, in order to find at least one solution to the S matrix $$\begin{bmatrix} S_1 \\ \vdots \\ S_M \end{bmatrix}$$

that allows for excursion compensation in the time domain and scaling in the frequency domain that satisfies performance requirements parameters of a communication system (e.g. EVM specifications in an LTE communication system). Examples of linear programming algorithms include a simplex algorithm, an interior points algorithm, or any other linear programming algorithm appreciated by those skilled in the art.

In embodiments, the parameters of the S matrix may be solved from the equality equation $$\begin{bmatrix} |v_{11}|^2 & \cdots & |v_{M1}|^2 \\ \vdots & \ddots & \vdots \\ |v_{1M}|^2 & \cdots & |v_{MM}|^2 \end{bmatrix} \begin{bmatrix} S_1 \\ \vdots \\ S_M \end{bmatrix} = \begin{bmatrix} \left(\frac{\eta_1}{100}\right)^2 P_1 \\ \vdots \\ \left(\frac{\eta_M}{100}\right)^2 P_M \end{bmatrix}.$$

This equality equation reflects an operating presumption that optimal excursion compensation occurs when the scaled excursion portions are at their maximum possible levels (e.g. the S matrix). While the inequality solution assures compliance with performance requirements parameters (e.g. EVM specifications), solving for the equality equation may simultaneously optimize excursion compensation and satisfy the performance requirements parameters.

Although this assumption determines subchannel powers in the frequency domain to which corresponding subchannel complex excursion values may be scaled to, excursions in the communication system may not be rigorously independent. Occasionally intervals will occur wherein the modulated signals prior to precoding on all but one path exhibit low magnitudes, while the remaining path exhibits a large magnitude. The magnitude of the precoded signals, as linear combinations of the input signals, may exhibit strong correlation over such time intervals, which would violate an assumption of rigorous independence. However, such intervals occur with such low frequency that the average time-correlation values are negligibly small.

In embodiments, it may be presumed for the purposes of calculating the S matrix that the V matrix is accurate on average. Embodiments may assume that the V matrix estimated by the multiple-input multiple-output communication system is reasonable accurate on average. Small deviations of the estimates of the H matrix and V matrix parameter values reflect practical limitations in perfectly performing channel estimation at all times. Since optimal scaled values computed solving the equality equation $$\begin{bmatrix} |v_{11}|^2 & \cdots & |v_{M1}|^2 \\ \vdots & \ddots & \vdots \\ |v_{1M}|^2 & \cdots & |v_{MM}|^2 \end{bmatrix} \begin{bmatrix} S_1 \\ \vdots \\ S_M \end{bmatrix} = \begin{bmatrix} \left(\frac{\eta_1}{100}\right)^2 P_1 \\ \vdots \\ \left(\frac{\eta_M}{100}\right)^2 P_M \end{bmatrix}$$

may exhibit errors if the V matrix values used do adequately correspond to the actual channel multipath interference, any such channel estimation errors may introduce degradation in the effectiveness of excursion compensation and/or may cause errors in satisfying the performance requirements parameters (e.g. EVM specifications). However, such degradations may be accommodated simply by introducing a noise margin into the performance requirements parameters. For example, in accordance with embodiments, target EVM values may use more conservative EVM values to ensure EVM specifications are met, in spite of unavoidable channel estimation imperfections.

In embodiments, the excursion portions which are subtracted from the delayed precoded communication signals are noise introduced to the delayed precoded communication signal generating the excursion compensated precoded communication signals. For simplicity of explanation, anything other than the original precoded signals may be regarded as noise, so whatever we subtract from delayed versions of the original precoded signals is noise. Thus, all of the excursion energy in each subchannel constitutes noise which will be measured during testing for compliance with performance requirements parameters (e.g. EVM specifications). Embodiments scale and filter the excursion portions to ensure that the noise introduced by excursion compensation satisfies performance requirements parameters. Excursion power may be filtered to ensure compliance with regulatory spectral masks limiting out-of-band emissions. Passband excursion noise may be scaled to assure compliance with the performance requirements parameters (e.g. EVM specifications). Embodiments may optimally shape original excursion signals so that they minimize unwanted excursions of precoded signal magnitude above the magnitude thresholds while assuring compliance with all frequency domain performance requirements. By eliminating only that amount of noise power which would have led to violation of such performance requirements, embodiments may assure the greatest possible reduction of signal magnitude peaks above the defined magnitude thresholds.

In embodiments which solve for the S matrix $$\begin{bmatrix} S_1 \\ \vdots \\ S_M \end{bmatrix}$$

using this equality, the optimum scaling of subchannels in the frequency domain may be accomplished. Particularly, in order to optimize amplifier performance, a system will eliminate the maximum allowable amount of noise while still satisfying the performance requirements parameters. Solving for the equality equation $$\begin{bmatrix} |v_{11}|^2 & \cdots & |v_{M1}|^2 \\ \vdots & \ddots & \vdots \\ |v_{1M}|^2 & \cdots & |v_{MM}|^2 \end{bmatrix} \begin{bmatrix} S_1 \\ \vdots \\ S_M \end{bmatrix} = \begin{bmatrix} \left(\frac{\eta_1}{100}\right)^2 P_1 \\ \vdots \\ \left(\frac{\eta_M}{100}\right)^2 P_M \end{bmatrix}$$

may satisfy this objective, in accordance with embodiments. This equality may be solved without use of a linear programming algorithm, which may simplify dynamic computation of the S matrix, in accordance with embodiments.

Although solving the inequality equation $$\begin{bmatrix} |v_{11}|^2 & \cdots & |v_{M1}|^2 \\ \vdots & \ddots & \vdots \\ |v_{1M}|^2 & \cdots & |v_{MM}|^2 \end{bmatrix} \begin{bmatrix} S_1 \\ \vdots \\ S_M \end{bmatrix} \leq \begin{bmatrix} \left(\frac{\eta_1}{100}\right)^2 P_1 \\ \vdots \\ \left(\frac{\eta_M}{100}\right)^2 P_M \end{bmatrix}$$

may produce parameters for the S matrix $$\begin{bmatrix} S_1 \\ \vdots \\ S_M \end{bmatrix}$$

that satisfy the performance requirements parameters of a communication system, every member of the class of solutions for this inequality may not necessarily optimize amplifier performance. Notwithstanding, there may be practical reasons why the S matrix $$\begin{bmatrix} S_1 \\ \vdots \\ S_M \end{bmatrix}$$

should be solved based on the inequality equation $$\begin{bmatrix} |v_{11}|^2 & \cdots & |v_{M1}|^2 \\ \vdots & \ddots & \vdots \\ |v_{1M}|^2 & \cdots & |v_{MM}|^2 \end{bmatrix} \begin{bmatrix} S_1 \\ \vdots \\ S_M \end{bmatrix} \leq \begin{bmatrix} \left(\frac{\eta_1}{100}\right)^2 P_1 \\ \vdots \\ \left(\frac{\eta_M}{100}\right)^2 P_M \end{bmatrix}.$$

Example FIG. 7 illustrates an excursion compensation unit 36, in accordance with embodiments. Excursion compensation unit 36 illustrates one of excursion compensation units 36a through 36d illustrated in example FIG. 4. Excursion compensation unit 36 receives one of the time domain precoded communication signals output from precoder 32, as illustrated in example FIG. 4. As an illustrative example, the time domain precoded communication signal input into excursion compensation unit may have a time domain waveform 40 (whose magnitude is illustrated in example FIG. 5A) with a portion of its magnitude greater than the signal magnitude threshold 42 of one of the associated amplifiers 38*a* through 38*d*. The time domain precoded communication signal 40 is initially split in excursion compensation unit 36 into a first precoded communication signal 41 and a second precoded communication signal 43.

The first precoded communication signal 41 is delayed by delay element 56, while the second precoded communication 43 signal is processed by time domain excursion generation unit 58 and frequency domain scaling unit 60. Following necessary filtering and scaling operations on the second precoded communication signal 43, an excursion signal derived from the second precoded communication signal 43 may ultimately be subtracted from the first precoded communication signal 41 to generate an excursion compensated precoded communication signal 45 (whose magnitude is illustrated as example waveform 46 in FIG. 5C) which is output from the excursion compensation unit 36. Delay element 56 may be implemented by any process and/or device appreciated by those skilled in the art. The purpose of delay element 56 is to allow time for the second precoded communication 43 signal to be processed by time domain excursion generation unit 58 and frequency domain scaling unit 60. Since a generated excursion signal may be subtracted from the first precoded communication signal 41 in synchronization to generate excursion compensated communication signal 45, delay element 56 allows for this synchronization. Since the required processing is accomplished in a fixed amount of time by the time domain excursion generating unit 58 and frequency domain scaling unit 60, only a constant amount of delay is required to maintain time alignment between the two inputs to subtraction operation 62.

The second precoded communication signal 43 (whose magnitude is illustrated as example waveform 40 in FIG. 5A) is input into time domain excursion generation unit 58. Time domain excursion generation unit 58 extracts in the time domain the portion of the second precoded communication signal 43 whose magnitude is above the signal magnitude threshold of the associated with the amplifiers 38*a* through 38*d* to generate time domain excursion signal (whose magnitude is illustrated as example waveform 44 in FIG. 5B). This time domain excursion signal may ultimately be subtracted from the first precoded communication signal 40 after filtering (to comply with regulatory constraints on power outside the signal bandwidth) and frequency domain channel scaling in frequency domain scaling unit 60 to generate excursion compensated precoded communication signal 45 whose magnitude lies below the signal magnitude threshold 42 of the associated amplifier (illustrated as example waveform 46 in FIG. 5C).

Extracted excursion signal (whose magnitude is illustrated as example waveform 44 in FIG. 5B) output from time domain excursion generation unit 58 is input into frequency domain scaling unit 60. In frequency domain scaling unit 60, an extracted excursion signal (whose magnitude is illustrated as example waveform 44 in FIG. 5B) is converted to the frequency domain excursion signal (illustrated as example frequency spectrum 50 in example FIG. 6A). The frequency domain excursion signal (e.g. frequency spectrum 50) is scaled in the frequency domain to generate scaled frequency domain signals (illustrated as example subchannels 54*a* through 54*h* in FIG. 6C). The scaling of the scaled frequency domain excursion signals (illustrated as example subchannels 54*a* through 54*h* in FIG. 6C) are scaled according to performance requirements parameters of the communication signal (e.g. the E matrix), the signal power of the original communication signals input into precoder 32 (e.g. the P matrix), and the precoding parameters of precoder 32 (e.g. the V matrix). The scaled frequency domain signals (illustrated as example subchannels 54*a* through 54*h* in FIG. 6C) are then converted back into the time domain to generate a time domain signal whose magnitude exhibits a substantially similar shape as the magnitude of the extracted excursion signal (as illustrated by example waveform 44 in example 5B). Although there may be distorted differences between extracted excursion signal (whose magnitude is illustrated by example waveform 44 in example 5B) before and after the time domain excursion extraction and the frequency domain channel scaling, extracted excursion signals may have substantially the same complex shape before and after frequency domain channel scaling, since it is to be subtracted in the time domain from the first precoded communication signal 41 by subtraction operation 62 such that the scaled precoded communication signal 45 is less than the signal magnitude threshold 42 of the associated amplifier.

Example FIG. 8 illustrates a time domain excursion generation unit 58, in accordance with embodiments. Second precoded communication signal 43 (whose magnitude is illustrated as example waveform 40 in FIG. 5A) may be input into time domain excursion generation unit 58. In embodiments, second precoded communication signal 43 may be interpolated at interpolation unit 64 by oversampling. In accordance with embodiments, the oversampling may be at a rate significantly higher than the Nyquist rate (e.g. four times the highest frequency of the precoded communication signal 40) or at an appropriate rate appreciated by those of ordinary skill in the art. Oversampling may improve resolution, reduce noise, and help avoid aliasing and phase distortion at the excursion extraction unit 66.

After interpolating at interpolation unit 64 (e.g. oversampling), the oversampled precoded communication signal 51 may be subjected to excursion extraction unit 66, which outputs an extracted excursion waveform 53 (whose magnitude is illustrated as example waveform 44 in FIG. 5B). The extracted excursion waveform 53 is the portion of the second precoded communication signal 43 whose magnitude is above the signal magnitude threshold 42 of the associated amplifier. After the extracted excursion waveform 53 is extracted, time domain scaling in time domain scaling unit 68 may be performed to compensate for signal magnitude losses which may occur in bandpass filter 74 and/or frequency domain scaling unit 60 to output time domain extracted excursion waveform 55.

In embodiments, time domain scaling may be optional. Although example FIG. 8 illustrates time domain scaling unit 68 at the output of excursion extraction unit 66, a time domain scaling unit may be alternatively implemented in a system at any point after interpolation unit 64 and prior to frequency domain scaling unit 60.

After processing in time domain scaling unit 68, bandpass filtering by bandpass filter 74 may reduce the range of spectral energy and reduce aliasing of the time domain extracted excursion waveform 55 to acceptable limits. Bandpass filter 74 may eliminate or substantially eliminate noise in the sidebands, which may in effect reduce the total signal power. In order to compensate for this reduction of signal power due to the bandpass filter 74, time domain scaling unit 68 may scale up the extracting excursion waveform 53. In embodiments illustrated in example FIG. 8, time domain scaling unit 68 may be performed based on a fixed ratio associated with characteristics of bandpass filter 74.

Bandpass filter 74 and any other filtering of excursion portions may be linear phase filtering or substantially linear phase filtering in order to avoid aliasing or any other frequency domain distortions of the excursion portions in time domain excursion generation unit, as appreciated by those skilled in the art. Phase linearity may be significant because deviation from linear phase may introduce frequency dependent delays to the excursion, which may make it impractical to maintain precise time-alignment between the excursion processing path 43 and the delay signal path 41 without introducing matching delay on the delayed signal path. Any frequency dependent delay, which may appear in the form of dispersion, is appreciated by those skilled in the art to represent signal quality degradation. In embodiments, all filtering of excursion energy should exhibit an approximately linear phase versus frequency characteristic.

After band pass filtering at bandpass filter 74, the filtered time domain extracted excursion waveform 59 may be decimated in decimation unit 70 by undersampling using the same rate or a different rate as the oversampling in the interpolation unit 64. The decimating may restore the needed match between the sample rates of precoded communication signal 41 delayed by delay 56 and filtered and scaled excursion signal 49. In embodiments, interpolation unit 64 and decimation unit 70 may be optional. In embodiments, time domain scaling unit 68 may be optional.

In embodiments, the time domain scaling at the time domain scaling unit 68 may be performed at a fixed scaling factor. One purpose for time domain scaling unit 68 is to compensate for signal power lost at bandpass filter 74. Since bandpass filter 74 may generate signal power loss at a relatively fixed ratio based on relatively fixed filter characteristics of bandpass filter 74, the time domain scaling unit 68 may cause upward scaling of excursion extracted waveform 53 at a similarly fixed ratio that will compensate for the loss of power in bandpass filter 74. In embodiments, a time domain scaling unit may be implemented in a system at any point after interpolation unit 64 (illustrated in example FIG. 8) and prior to frequency domain scaling unit 60.

In embodiments illustrated in example FIG. 9, the time domain scaling unit 68 may be performed using feedback from frequency domain scaling unit 60. Feedback from frequency domain scaling unit 60 may allow for dynamic compensation for characteristics of the scaling performed in frequency domain scaling unit 60 that affect the signal power in the time domain. In embodiments, feedback from frequency domain scaling unit 60 to time domain scaling unit 68 may supplement static time domain scaling performed based on a fixed ratio associated with characteristics of bandpass filter 74. Notwithstanding if or how time domain scaling unit 68 performs scaling, time domain scaling unit 68 may be performed prior to the scaling of frequency domain subchannels in subchannel scaling unit 76 (illustrated in example FIG. 10), in accordance with embodiments.

Example FIG. 10 illustrates frequency domain scaling unit 60, in accordance with embodiments. Extracted excursion signal 47 (whose magnitude is illustrated as example waveform 44 in FIG. 5B) output from excursion extraction unit 58 may be input into frequency domain scaling unit 60. Extracted excursion signal 47 may be mapped to the frequency domain in frequency domain mapping unit 72 to generate frequency domain excursion signal 57 (illustrated as example frequency domain signal 50 in FIG. 6A). In embodiments, frequency domain mapping unit 72 may use a fast Fourier transform (FFT) or any other technique appreciated by those skilled in the art.

The frequency domain excursion signal 61 output from frequency domain mapping unit 72 may be input into subchannel scaling unit 76, in accordance with embodiments. In embodiments, the subchannels in the frequency domain excursion signal 61 (e.g. example subchannels 54a through 54h illustrated in FIG. 6C) may be scaled according to the performance requirements parameters of the communication system (e.g. the E matrix), the power level of communication signals input into precoder 32 (e.g. the P matrix), and the precoding parameters used in precoder 32 (e.g. the V matrix). As discussed above, in embodiments, these subchannels are scaled according to an S matrix, which may be calculated from the corresponding V matrix, E matrix, and P matrix for a particular subchannel frequency $f_n$. Scaling may be accomplished by multiplying each complex excursion subchannel sample by the square-root of the ratio of the corresponding entry in the S matrix to the estimated power of complex excursion sample (or samples) in that subchannel prior to frequency domain scaling, The subchannel scaling unit 76 introduces noise at levels that satisfy a communication system's performance requirements parameters in the respective subchannels into the corresponding receiver demodulator, while eliminating the excursion in the time domain precoded communication signal 40 that is above the signal magnitude threshold 42 (illustrated in example waveform 46 in FIG. 5C).

Frequency domain scaled subchannels 61 (illustrated as example subchannels 54a through 54h in FIG. 6C) are output from subchannel scaling unit 76. The frequency domain scaled subchannels 61 are mapped back to the time domain in time domain mapping unit 78 to generate a time domain channel scaled signal 49 having a substantially similar waveform as the extracted excursion waveform 53 (whose magnitude is illustrated as example extracted signal 44 in FIG. 5B). The difference between extracted excursion waveform 53 and the time domain channel scaled signal 49 is that in the time domain channel scaled signal 49 subchannel frequency components are scaled to satisfy the performance requirements parameters of a communication system. The time domain channel scaled signal 49 may be subtracted from the delayed first precoded communication signal 41 such that the associated amplifier operates below the signal magnitude threshold 42. In embodiments, mapping to the time domain using time domain mapping unit 78 may be performed by an inverse fast Fourier transform (IFFT).

Embodiments are illustrated using an example of base station 18 and mobile phone 12, however these examples are merely for illustration and are not intended to be limiting. Embodiments relate to any multipath communication system that using multiple transmitters and multiple receivers, which are not limited to wireless communication systems. In multipath communication systems where normally interfering subchannels are precoded and are also subject to performance requirements parameters, these subchannels may be scaled such that excursions above an amplifier's signal magnitude threshold can be optimally suppressed while continuing to satisfy the performance requirements parameters.

Although embodiments and their advantages have been described in detail, it should be understood that various changes, substitutions and alterations can be made herein without departing from the spirit and scope of the disclosed as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving a plurality of communication signals;
   precoding the plurality of communication signals into a plurality of precoded communication signals;
   excursion compensating the plurality of precoded communication signals into a plurality of excursion compensated precoded communication signals, wherein the excursion compensating is based on performance requirements parameters of a communication system, and wherein the excursion compensating is based on parameters of the precoding the plurality of communication signals.

2. A method of claim 1, wherein:
   the plurality of communication signals are received at a precoder;
   the precoder outputs the plurality of precoded communication signals;
   the method comprises receiving each of the plurality of precoded communication signals at a different corresponding excursion compensation unit of a plurality of excursion compensation units;
   the excursion compensating the precoded communication signal at the corresponding excursion compensation unit to output each of the plurality of excursion compensated precoded communication signals, wherein the excursion compensating comprises:
   extracting in a time domain an excursion portion of the precoded communication signal,
   scaling in a frequency domain a plurality of subchannels of the excursion portion based on performance requirements parameters of a communication system and based on parameters of the precoding of the plurality of communication signals to generate a scaled excursion portion, and
   subtracting the scaled excursion portion from the corresponding precoded communication signal to generate each of the excursion compensated precoded signals.

3. The method of claim 2, comprising:
   amplifying the excursion compensated precoded communication signal at a corresponding amplifier to output an amplified excursion compensated precoded communication signal, wherein the corresponding amplifier is one of a plurality of amplifiers and each of the plurality of amplifiers is associated with one of the plurality of excursion compensation units;
   propagating at a corresponding transmitting antenna the amplified excursion compensated precoded communication signal as a propagated excursion compensated precoded communication signal, wherein the corresponding transmitting antenna is one of a plurality of transmitting antennas and each of the plurality of transmitting antennas is associated with one of the excursion compensation units;
   receiving at a plurality of receiving antennas of a receiver the propagated excursion compensated precoded communication signal, wherein:
   the received excursion compensated precoded communication signal is one of a plurality of received excursion compensated precoded communication signals,
   each of the plurality of received excursion compensated precoded communication signals is received at the plurality of receiving antennas of a receiver, and
   each of the plurality of received excursion compensated precoded communication signals is associated with the plurality of precoded communication signals output from the precoder at the transmitter;
   post processing at the receiver the received excursion compensated precoded communication signal with a plurality of received excursion compensated precoded communication signals to reconstruct the plurality of communication signals, wherein the plurality of reconstructed communication signals satisfies the performance requirements parameters of the communication system.

4. The method of claim 3, wherein the performance requirements parameters are error vector magnitude specifications based on subchannel noise power levels of the plurality of reconstructed communication signals generated at the receiver compared to the plurality of communication signals generated at a transmitter.

5. The method of claim 1, wherein:
   the precoding the plurality of communication signals into the plurality of precoded communication signals are precoded according to parameters of a V matrix to selectively mix each subchannel of the plurality of communication signals into subchannels of the plurality of precoded communication signals;
   the performance requirements parameters of the communication system is represented by an E matrix; and
   data power levels of the plurality of communication signals prior to precoding is represented by a P matrix; and
   the scaling of the each subchannel of the plurality of precoded communication signals into the plurality of scaled precoded communications signals are scaled according to the parameters of a S matrix, wherein the S matrix is determined from the parameters of the V matrix, the parameters of the E matrix, and the parameters of the P matrix.

6. The method of claim 5, wherein:
   the V matrix is represented as $$\begin{bmatrix} v_{11} & \cdots & v_{1M} \\ \vdots & \ddots & \vdots \\ v_{M1} & \cdots & v_{MM} \end{bmatrix},$$

wherein the V matrix is a M by M matrix with M being a number of transmitters in the communication system, and wherein parameters of the V matrix are expressed as complex numbers;
a modified V matrix is represented as $$\begin{bmatrix} |v_{11}|^2 & \cdots & |v_{M1}|^2 \\ \vdots & \ddots & \vdots \\ |v_{1M}|^2 & \cdots & |v_{MM}|^2 \end{bmatrix},$$

wherein parameters of the modified V matrix are derived from a calculation of absolute values squared of the parameters of a transpose of the V matrix;

the S matrix is represented as $$\begin{bmatrix} S_1 \\ \vdots \\ S_M \end{bmatrix},$$

wherein the S matrix is a M by 1 matrix with M being the number of transmitters in the communication system;
the E matrix is represented as $$\begin{bmatrix} \eta_1 \\ \vdots \\ \eta_M \end{bmatrix},$$

wherein the E matrix is a M by 1 matrix with M being the number of transmitters in the communication system and each parameter of the E matrix represents a maximum allowable noise to signal ratio requirement expressed as a percentage for the plurality of communication signals;
the P matrix is represented as $$\begin{bmatrix} P_1 \\ \vdots \\ P_M \end{bmatrix},$$

wherein the P matrix is a M by 1 matrix with M being the number of transmitters in the communication system; and
parameters of a $$\begin{bmatrix} \left(\frac{\eta_1}{100}\right)^2 P_1 \\ \vdots \\ \left(\frac{\eta_M}{100}\right)^2 P_M \end{bmatrix}$$

matrix are derived from parameters of the E matrix and the P matrix.

7. The method of claim 6, wherein the parameters of the modified V matrix are derived from the parameters of the V matrix based on an assumption that excursion waveforms present in the plurality of precoded communication signals are effectively independent.

8. The method of claim 7, wherein the assumption that the excursion waveforms present in the plurality of precoded communication signals ignores that the excursion waveforms are not rigidly independent.

9. The method of claim 6, wherein the parameters of the S matrix used in the scaling of the plurality of precoded communication signals are determined by solving an equality of $$\begin{bmatrix} |v_{11}|^2 & \cdots & |v_{M1}|^2 \\ \vdots & \ddots & \vdots \\ |v_{1M}|^2 & \cdots & |v_{MM}|^2 \end{bmatrix} \begin{bmatrix} S_1 \\ \vdots \\ S_M \end{bmatrix} = \begin{bmatrix} \left(\frac{\eta_1}{100}\right)^2 P_1 \\ \vdots \\ \left(\frac{\eta_M}{100}\right)^2 P_M \end{bmatrix}$$

for the parameters of the S matrix.

10. The method of claim 6, wherein the parameters of the S matrix used in the scaling of the plurality of precoded communication signals are determined by solving an inequality of $$\begin{bmatrix} |v_{11}|^2 & \cdots & |v_{M1}|^2 \\ \vdots & \ddots & \vdots \\ |v_{1M}|^2 & \cdots & |v_{MM}|^2 \end{bmatrix} \begin{bmatrix} S_1 \\ \vdots \\ S_M \end{bmatrix} \leq \begin{bmatrix} \left(\frac{\eta_1}{100}\right)^2 P_1 \\ \vdots \\ \left(\frac{\eta_M}{100}\right)^2 P_M \end{bmatrix}$$

for the parameters of the S matrix.

11. The method of claim 10, wherein the inequality is solved by at least one of a linear programming algorithm, a simplex algorithm, or an interior points algorithm.

12. The method of claim 1, comprising amplifying each excursion compensated precoded communication signal at a corresponding amplifier to output an amplified excursion compensated precoded communication signal, wherein:
the corresponding amplifier is one of a plurality of amplifiers:
each of the plurality of amplifiers is associated with one of a plurality of excursion compensation units;
each of the plurality of excursion compensated precoded communication signals is amplified by only one of the plurality of amplifiers;
each of the plurality of amplifiers has a corresponding input signal magnitude threshold characteristic;
the excursion compensating is performed on the excursion portion of each of the plurality of precoded communications signals whose magnitude exceed the corresponding input signal magnitude threshold of the corresponding amplifier such that the excursion compensated precoded communication signals has a signal magnitude that is less than the corresponding input signal magnitude threshold of the corresponding amplifier and that the performance requirements parameters of the communication system are satisfied.

13. The method of claim 12, wherein the performance requirements parameters correspond with error vector magnitude specifications of each of the plurality of communication signals.

14. The method of claim 13, wherein the error vector magnitude specifications specify a maximum short-term average ratio of total noise to signal power in any subchannel of the plurality of communication signals as measured at the output of the corresponding demodulator at a receiver.

15. The method of claim 13, wherein the error vector magnitude specifications are based on the combination of modulation order and error-correction coding rate of the plurality of communication signals input into the precoder.

16. The method of claim 1, wherein the excursion compensating the precoded communication signal comprises:
splitting each of the plurality of precoded communication signals into a first precoded communication signal and a second precoded communication signal;
extracting a portion of the second precoded communication signal whose magnitude exceeds a corresponding input signal magnitude threshold of a corresponding amplifier to generate the excursion portion;
scaling in a frequency domain a plurality of subchannels of the excursion portion to generate the scaled excursion portion based on the performance requirements parameters of the plurality of communication signals and the parameters of the precoding the plurality of communication signals;

delaying the first precoded communication signal to be synchronized with the scaled excursion portion; and subtracting in the time domain the scaled excursion portion from the delayed first precoded communication signal to generate the excursion compensated precoded communication signal.

17. The method of claim 16, comprising scaling in the time domain the excursion portion to compensate for signal power that will be lost in the scaling in the frequency domain of the plurality of subchannels in the excursion signal.

18. The method of claim 17, wherein the scaling in the time domain of the excursion portion is based on feedback from a frequency domain scaling unit that performs the scaling in the frequency domain of the plurality of subchannels of the excursion signals.

19. The method of claim 16, comprising filtering in the time domain the excursion portion using a bandpass filter corresponding to a spectrum of the plurality of communication signals.

20. The method of claim 19, comprising scaling in the time domain the excursion portion based on static characteristics of the bandpass filter.

21. The method of claim 19, wherein the filtering the excursion portion is performed prior to generating the scaled excursion portion.

22. The method of claim 16, comprising:
interpolating the second precoded communication signal prior to the extracting the excursion portion; and
decimating the second precoded communication signal after the extracting the excursion portion.

23. The method of claim 22, comprising scaling in the time domain after the interpolating and prior to the scaling in the frequency domain, wherein the scaling in the time domain scales the excursion portion to compensate for signal power that will be lost in the scaling in the frequency domain the plurality of subchannels of the excursion portion.

24. The method of claim 16, comprising:
mapping to the frequency domain the excursion portion prior to generating the scaled excursion portion; and
mapping to the time domain scaled excursion portion prior to subtracting the scaled excursion portion from the delayed first precoded communication signal.

25. The method of claim 1, wherein the communication system is a multiple input multiple output communication system.

26. The method of claim 25, wherein the multiple input multiple output communication system is a wireless communication system which comprises multiple transmitter antennas and multiple receiver antennas.

27. The method of claim 26, wherein the multiple input multiple output wireless communication system is a long-term evolution (LTE) wireless communication system.

28. The method of claim 27, wherein the long-term evolution (LTE) wireless communication system has four transmitter antennas at a base station and two receiver antennas at a mobile terminal.

29. The method of claim 26, wherein the method is implemented at a base station.

30. The method of claim 26, wherein the method is implemented at a mobile terminal.

31. The method of claim 26, wherein the wireless communication system is at least one of:
a Wi-Fi wireless communication system;
a WiMAX wireless communication system; or
a HSPA+ wireless communication system.

32. The method of claim 26, wherein the wireless communication system is at least one of:
a frequency division multiple access communication system;
an orthogonal frequency division multiple access communication system; or
a single carrier frequency division multiple access communication system.

33. The method of claim 25, wherein the multiple-input multiple-output communication system is a wired communication system or an optical communication system.

34. An apparatus configured to operate on a communication system comprising:
a precoder configured to receive a plurality of communication signals, wherein the precoder mixes the plurality of communication signals to output a plurality of precoded communication signals based on parameters of the precoder; and
an excursion compensation unit configured to receive the plurality of precoded communication signals and output a plurality of excursion compensated precoded communication signals,
wherein the excursion compensation unit modifies the plurality of precoded communication signals based on performance requirements parameters of the communication system and based on the parameters of the precoder.

* * * * *